United States Patent [19]
Takada

[11] Patent Number: 5,850,477
[45] Date of Patent: Dec. 15, 1998

[54] INPUT AND DISPLAY APPARATUS WITH EDITING DEVICE FOR CHANGING STROKE DATA

[75] Inventor: Yuji Takada, Nara, Japan

[73] Assignee: Sharp Kabushiki Kaisha, Osaka, Japan

[21] Appl. No.: 580,327

[22] Filed: Dec. 28, 1995

[30]    Foreign Application Priority Data

Dec. 29, 1994   [JP]   Japan .................................. 6-340091

[51] Int. Cl.⁶ .............................. G06K 9/18; G06K 9/00; G06K 9/03
[52] U.S. Cl. ......................... 382/186; 382/189; 382/309
[58] Field of Search ................................... 382/177, 178, 382/179, 185, 186, 187, 188, 189, 309, 310, 311, 200; 178/18–20; 395/792, 326; 345/173, 179

[56]          References Cited

U.S. PATENT DOCUMENTS

| | | | |
|---|---|---|---|
| 4,607,386 | 8/1986 | Morita et al. ............................ | 382/185 |
| 4,680,803 | 7/1987 | Dilella .................................... | 382/178 |
| 4,727,588 | 2/1988 | Fox et al. ................................ | 382/177 |
| 4,731,857 | 3/1988 | Tappet .................................... | 382/187 |
| 4,860,372 | 8/1989 | Kuzunuki et al. ...................... | 382/189 |
| 4,953,225 | 8/1990 | Togawa et al. ......................... | 382/179 |
| 4,972,496 | 11/1990 | Sklarew ................................. | 382/202 |
| 5,046,114 | 9/1991 | Bobel ..................................... | 382/178 |
| 5,335,294 | 8/1994 | Niki ....................................... | 382/177 |
| 5,448,475 | 9/1995 | Senoo et al. ........................... | 382/187 |
| 5,497,432 | 3/1996 | Nishida .................................. | 382/178 |
| 5,500,937 | 3/1996 | Thompson-Rohrlich .............. | 382/311 |
| 5,517,578 | 5/1996 | Altman et al. ......................... | 382/177 |
| 5,594,810 | 1/1997 | Gourdol ................................. | 382/187 |
| 5,613,019 | 3/1997 | Altman et al. ......................... | 382/311 |
| 5,698,822 | 12/1997 | Haneda et al. . | |

FOREIGN PATENT DOCUMENTS

| | | | |
|---|---|---|---|
| 0 206829 | 12/1986 | European Pat. Off. ......... | G06K 9/22 |
| 0 559353 | 9/1993 | European Pat. Off. .......... | G06F 3/33 |
| 62-229365 | 10/1987 | Japan .............................. | G06F 15/20 |

OTHER PUBLICATIONS

New Riverside University Dictionary, 1984, p. 337.

*Primary Examiner*—Bipin Shalwala

[57]          ABSTRACT

It is an object of the invention to present an input and display apparatus for handwritten characters capable of freely editing input handwritten characters. A handwritten character entered on a touch panel by using a pen is registered as one stroke data. The registered one stroke data is divided in two stroke data by using the pen, or two stroke data are combined into one stroke data. By combination of stroke data division and combination, partial deletion in stroke data, blank insertion in stroke data, and insertion of other stroke data into stroke data are realized.

15 Claims, 22 Drawing Sheets

|  | X-POS. | Y-POS. | RECT. X-DIR. SIZE | RECT. Y-DIR. SIZE |
|---|---|---|---|---|
| STROKE DATA 38 |  |  |  |  |
| STROKE DATA 39 |  |  |  |  |
|  |  |  |  |  |
| STROKE DATA 43 |  |  |  |  |

47

| DATA NO. | X-DIR. | | Y-DIR. | |
|---|---|---|---|---|
| | X1 | X2 | Y1 | Y2 |
| SD1 | X1(1) | X2(1) | Y1(1) | Y2(1) |
| SD2 | X1(2) | X2(2) | Y1(2) | Y2(2) |
| SD3 | X1(3) | X2(3) | Y1(3) | Y2(3) |
| ( | ( | ( | ( | ( |
| SDn | X1(n) | X2(n) | Y1(n) | Y2(n) |

STROKE DATA DISPLAY COORDINATE TABLE

X1 : RECT. LEFT END X-COORDINATE

X2 : RECT. RIGHT END X-COORDINATE

Y1 : RECT. UPPER END Y-COORDINATE

Y2 : RECT. LOWER END Y-COORDINATE

FIG. 18

| LINE SEGMENT | REL. COORDINATES OF END POINT OF LINE SEGMENT | | ABSOL. COORDINATES OF END POINT OF LINE SEGMENT | | PEN UP/DOWN |
|---|---|---|---|---|---|
| | X1 | Y1 | X2 | Y2 | |
| (START POINT) | X0 | Y0 | — | — | |
| S1 | X1(1) | Y1(1) | X2(1) | Y2(1) | Z(1) |
| S2 | X1(2) | Y1(2) | X2(2) | Y2(2) | Z(2) |
| S3 | X1(3) | Y1(3) | X2(3) | Y2(3) | Z(3) |
| ⋮ | ⋮ | ⋮ | ⋮ | ⋮ | ⋮ |
| Sn | X1(n) | Y1(n) | X2(n) | Y2(n) | Z(n) |

FIG. 19A

| LINE SEGMENT | REL. COORDINATES | | PEN UP/DOWN |
|---|---|---|---|
| | X | Y | |
| (START POINT) | XA0 | YA0 | |
| SA1 | XA(1) | YA(1) | ZA(1) |
| SA2 | XA(2) | YA(2) | ZA(2) |
| SA3 | XA(3) | YA(3) | ZA(3) |
| ⋮ | ⋮ | ⋮ | ⋮ |
| SAn1 | XA(n1) | YA(n1) | ZA(n1) |

FIG. 19B

| LINE SEGMENT | REL. COORDINATES | | PEN UP/DOWN |
|---|---|---|---|
| | X | Y | |
| (START POINT) | XB0 | YB0 | |
| SB1 | XB(1) | YB(1) | ZB(1) |
| SB2 | XB(2) | YB(2) | ZB(2) |
| SB3 | XB(3) | YB(3) | ZB(3) |
| ⋮ | ⋮ | ⋮ | ⋮ |
| SBn2 | XB(n2) | YB(n2) | ZB(n2) |

STROKE DATA A  STROKE DATA B

LINE SEGMENT Ssp

RECTANGULAR RIGHT END OF STROKE DATA A
= RECTANGULAR LEFT END OF STROKE DATA B

FIG. 25A

| LINE SEGMENT | REL. COORDINATES | | PEN UP/DOWN | ABSOL. COORDINATES | |
|---|---|---|---|---|---|
| | X | Y | | X | Y |
| (START POINT) | XA0 | YA0 | — | — | — |
| SA1 | XA(1) | YA(1) | ZA(1) | X1A(1) | Y1A(1) |
| SA2 | XA(2) | YA(2) | ZA(2) | X1A(2) | Y1A(2) |
| SA3 | XA(3) | YA(3) | ZA(3) | X1A(3) | Y1A(3) |
| ⋮ | ⋮ | ⋮ | ⋮ | ⋮ | ⋮ |
| SAn1 | XA(n1) | YA(n1) | ZA(n1) | X1A(n1) | Y1A(n1) |

FIG. 25B

| LINE SEGMENT | REL. COORDINATES | | PEN UP/DOWN |
|---|---|---|---|
| | X | Y | |
| (START POINT) | XB0 | YB0 | |
| SB1 | | | |
| SB2 | | | |
| SB3 | | | |
| ⋮ | | | |
| SBn2 | | | |

FIG. 26

| LINE SEGMENT | REL. COORDINATES | | PEN UP/DOWN |
|---|---|---|---|
| | X | Y | |
| | X0 | Y0 | |
| S1 | X(1) | Y(1) | Z(1) |
| S2 | X(2) | Y(2) | Z(2) |
| S3 | X(3) | Y(3) | Z(3) |
| ⋮ | ⋮ | ⋮ | ⋮ |
| S(n1+n2+1) | X(n1+n2+1) | Y(n1+n2+1) | Z(n1+n2+1) |

INPUT AND DISPLAY APPARATUS WITH EDITING DEVICE FOR CHANGING STROKE DATA

BACKGROUND OF THE INVENTION

1. Field of the Invention

The present invention relates to an input and display apparatus (hereinafter described as input/display apparatus) for handwritten characters preferably used in electronic pocket notebooks, word processors, personal computers, etc.

2. Description of the Related Art

Input/display apparatuses for handwritten characters capable of inputting and displaying handwritten characters have been already commercialized. In such input/display apparatuses for handwritten characters of prior art, characters entered on an input board realized by a tablet or the like are inputted in an input/display apparatus for handwritten characters as a set of coordinate points on the input board, and the handwritten characters inputted as a set of coordinate points are registered and displayed in the size and shape as they have been inputted.

Alternatively, there is also an input/display apparatus for handwritten characters in which handwritten characters are handled on stroke data undergoing so-called stroke processing on the basis of the coordinate points composing the handwritten characters, and the input stroke data is displayed at a cursor position by normalizing to a specific height. Other prior art includes Japanese Unexamined Patent Publication JPA 62-229365 (1987). In this publication, the handwriting information of handwriting input is edited by cutting out in specified edit processing unit. When handling stroke data, by cutting out in every specific stroke data according to a predetermined rule, the cut stroke data is handled as one block, and editing is done in the block unit of minimum unit that cannot be subdivided any more.

When handling stroke data in a conventional input/display apparatus for handwritten characters, the extent from start till end of a stroke is handled as one block unit, but once inputted and the data is registered in the apparatus, it cannot be subdivided into smaller blocks. For example, when it is attempted to divide stroke data "My name is Richard Miller" into "My name is" and "Richard Miller" by manipulation such as pressing of touch panel on the display screen by using an input pen or the like (hereinafter called pen manipulation) and copy only "Richard Miller," the data cannot be cut out because it is registered in the apparatus in one block of "My name is Richard Miller".

If attempted to delete "River" of stroke data "the Hudson River" by pen manipulation, only a specific portion in one block cannot be deleted, and therefore after deleting the entire block of "The Hudson River," it is necessary to input "The Hudson" newly.

It may be also desired to combine two stroke data into one stroke data. For example, it may be to combine stroke data "Richard" and stroke data "Miller" into one stroke data "Richard Miller," and copy or move display position in this data block unit. The conventional apparatus, however, has no function of combining two stroke data into one stroke data by pen manipulation or other instruction. Therefore, once stroke data "Richard" and "Miller" must be deleted, and then "Richard Miller" must be newly inputted.

Furthermore, in the case of input of stroke data "Weare," it is registered in the apparatus as a block of stroke data "Weare," and if desired to change to new stroke data by inserting a space (blank) of desired width between "We" and "are" by pen manipulation or the like, such editing function is not provided. In such a case, the stroke data must be once erased, and newly entered again.

Similarly, in the case of input of stroke data "this a pen," if desired to insert a block "is" between "this" and "a pen" by pen manipulation or the like, such editing function is not provided. In this case, too, one the input stroke data must be erased, and newly entered again.

SUMMARY OF THE INVENTION

It is hence a primary object of the invention to provide an input/display apparatus for handwritten characters capable of freely editing input handwritten characters.

The present invention provides an input/display apparatus for handwritten characters, including display means provided with a display surface in which orthogonal coordinates are defined, and input means having a light transmitting input surface in which orthogonal coordinates are defined, which outputs coordinate points indicated by special indicating means, on the input surface disposed so as to overlap with the display surface, and displaying the coordinate points on the display surface of the display means, corresponding to a plurality of coordinates points indicated at the time of input in handwriting when the input surface discontinuously indicate by the indicating means, the input/display apparatus for handwritten characters comprising:

cursor display means for displaying a cursor indicating the position for input/display on the display surface of the display means, stroke data preparing means for preparing stroke data consisting of coordinate points which are extracted after the end of input in handwriting from among a plurality of coordinate points outputted from the input means at the time of input in handwriting on the basis of a predetermined reference, storage means for storing stroke data, first editing means for dividing coordinate points composing one stroke data into plural coordinate point groups, and creating plural stroke data composed of coordinate point groups, and normalizing display means for setting rectangular coordinates of specific size after a cursor position displayed on a display surface of the display means, and displaying stroke data on the rectangular coordinates.

The invention is characterized in that the first editing means is replaced by:

second editing means for dividing the coordinate points composing one stroke data into plural coordinate point groups, erasing coordinate point groups selected from the coordinate point groups, and creating stroke data composed of the remaining coordinate point groups.

Further the invention is characterized in that the first editing means is replaced by:

third editing means for adding coordinate points for composing other stroke data after coordinate points for composing one stroke data of two stroke data, and creating one stroke data composed of coordinate points composing one and other stroke data.

Further the invention is characterized in that the first editing means is replaced by:

fourth editing means for dividing coordinate points composing one stroke data into two coordinate point groups, and creating one stroke data by correcting the coordinates of coordinate points composing either one coordinate point group of the two divided coordinate point groups, so as to be a blank region when displayed in the display means.

Further the invention is characterized in that the first editing means is replaced by:

fifth editing means for dividing coordinate points composing one stroke data into two coordinate point groups, inserting coordinate points composing other stroke data between divided coordinate point groups, and creating one stroke data composed of coordinate points composing the divided plural coordinate point groups and other stroke data.

Further the invention is characterized in that the editing means:

sets a first rectangular region including stroke data to be divided;

deduces a coordinate point in the first rectangular region, corresponding to the coordinate point on the input board designated by the indicating means;

divides the first rectangular region by a division boundary line including the deduced coordinate point into two second rectangular regions, when the stroke data traverses the division boundary line with a pen up, considers a start point AS of the pen up line segment A crossing the division boundary line as an end point of the stroke data in one of the two second rectangular regions including the start point AS, and an end point AE of the line segment A as a start point of the stroke data in the other of the two second rectangular regions including the end point AE, when the stroke data traverses the division boundary line with a pen down, divides the pen down line segment B crossing the division boundary line into a pen down line segment B1 in which a start point BS of the pen down line segment B is a start point B1S and the intersecting point BC between the line segment B and the division boundary line is an end point B1E, a pen up line segment B2 in which the intersecting point BC is a start point B2S and an end point B2E (=B2S), and a pen down segment B3 in which the intersecting BC is a start point B3S and the end point BE of the line segment B is an end point B3E, and divides the coordinate points composing one stroke data into plural coordinate point groups, considering the start point B2S of the line segment B2 as the end point of the stroke data in the one second rectangular region including the start point B2S, and the end point B2E of the line segment B2 as the start point of the stroke data in the other second rectangular region including the end point B2E.

Further the invention is characterized in that the second editing means, after dividing stroke data into plural coordinate point groups, deletes the coordinate group selected by designation of the indicating means.

Further the invention is characterized in that, the third editing means creates a pen up line segment E of a predetermined length, in which the end point of one stroke data C of two stroke data C and D is a start point ES and the start point of the other stroke data D is an end point EE, adds the created pen up line segment E to the end of the stroke data C, and additionally adds the stroke data D.

Further the invention is characterized in that the third editing means creates one stroke data by conforming the sizes of the rectangular regions of two stroke data to each other.

Further the invention is characterized in that the stroke data includes attribute data indicating the width and type of character line, and the third editing means creates one stroke data by conforming the attribute data of two stroke data.

Further the invention is characterized in that the fourth editing means after dividing stroke data into stroke data F and G of two coordinate groups, creates a pen up line segment H of a length which forms a blank region of a predetermined size, considering the end point of the one stroke data F as a start point HS, and the start point of the other stroke data G as an end point HE, adds the created pen up line segment H to the end of the stroke data F, and additionally adds the stroke data G.

Further the invention is characterized in that the fifth editing means, after dividing stroke data into stroke data I and J of two coordinate point groups, creates a pen up line segment L of a predetermined length, in which the start point of the stroke data K to be inserted is an end point LE, adds the created pen up line segment L to the end of the stroke data I, additionally creates stroke data M by adding the stroke data K, creates a pen up line segment N of a predetermined length, in which the end point of the stroke data M is a start point NS, and the start point of the other stroke data J as an end point NE, adds the created pen up line segment N to the end of the stroke data M, and additionally creates one stroke data by adding the stroke data J.

According to the invention, by continuously instructing the input surface of input means by instructing means, that is, by handwriting input, instructed plural coordinate points of the input surface in which rectangular coordinates are preliminarily set are outputted, the coordinate points of the display surface of the display means coinciding with the coordinate points come in display state. On the display surface of the display means, rectangular coordinates are preliminarily set, and the input surface having light permeability of the input means is disposed so as to overlay the display surface.

On the display surface of the display means, a cursor showing an input display position is displayed, and by handwriting input as mentioned above, stroke data composed of coordinate points extracted on the basis of a predetermined standard from plural coordinate points outputted from the input means is created, and stored. The created stroke data is displayed on the rectangular coordinates of specific size being set after the cursor display position. By the first editing means, the coordinate points composing one stroke data are divided into plural coordinate point groups, and plural stroke data composed of coordinate points are created. Thus created plural stroke data are also displayed on the rectangular coordinates of specific size being set after the cursor display position.

It is therefore possible to divide one stroke data created by one operation of handwriting input and handle as plural stroke data. For example, only one of the plural stroke data divided and created can be moved or displayed, or copied and displayed.

According to the invention, by the second editing means provided instead of the first editing means, the coordinate points composing one stroke data are divided into plural coordinate point groups, coordinate point groups selected from the coordinate point groups are erased, and stroke data is composed of the remaining coordinate point groups. Thus created stroke data is also displayed as mentioned above. Therefore, part of one stroke data created by one operation of handwriting input can be erased.

According to the invention, by the third editing means provided instead of the first editing means, coordinate points composing other stroke data are added after coordinate points for composing one stroke data of two stroke data, and one stroke data composed of coordinate points composing one and other stroke data is created. Thus created stroke data is also displayed as mentioned above. Therefore, two stroke data created by different operations of handwriting input can be handled as one stroke data. For example, two stroke data created by different operations of handwriting input can be simultaneously moved and displayed, or copied and displayed as one stroke data.

According to the invention, by the fourth editing means provided instead of the first editing means, coordinate points composing one stroke data are divided into two coordinate point groups, and coordinates of coordinate points composing either one coordinate point group of the two divided coordinate point groups are corrected, so that it may be a blank region when displayed in the display means, thereby creating one stroke data. Thus created stroke data is also displayed as mentioned above. It is therefore possible to insert and display a blank region in one stroke data created by one operation of handwriting input.

According to the invention, by the fifth editing means provided instead of the first editing means, the coordinate points for composing one stroke data are divided into two coordinate point groups, coordinate points composing other stroke data are inserted between the divided coordinate point groups, thereby creating one stroke data composed of divided plural coordinate point groups and coordinate points composing other stroke data. Therefore, stroke data created by different operation of handwriting input can be inserted and displayed in one stroke data created by one operation of handwriting input.

According to the invention, the first editing means sets the first rectangular region including stroke data to be divided at the time of dividing the stroke data, deduces the coordinate point in the first rectangular region, corresponding to the coordinate point on the input board designated by the indicating means, and divides the first rectangular region by a division boundary line including the deduced coordinate point into one second rectangular region and other rectangular region.

When the stroke data traverses the division boundary line with a pen up, considering a start point AS of the pen up line segment A crossing the division boundary line as an end point of the stroke data in one of the two second rectangular regions including the start point AS, one stroke data including the start point of the stroke data before dividing and the end point is created. Additionally, considering an end point AE of the line segment A as a start point of the stroke data in other of the two second rectangular regions including the end point AE, the other stroke data including the end point of the stroke data before dividing and the start point is created.

When the stroke data traverses the division boundary line with a pen down, first the pen down line segment B is divided into three line segments B1 to B3, namely, a pen down line segment B1 in which a start point BS of the pen down line segment B crossing the division boundary line is considered as a start point BIS and the intersecting point BC between the line segment B and the division boundary line is considered as an end point B1E, a pen up line segment B2 in which the intersecting point BC is considered as a start point B2S and as an end point B2E (=B2S), and a pen down segment B3 in which the intersecting BC is considered as a start point B3S and the end point BE of the line segment B is considered an end point B3E.

Next, considering the start point B2S of the line segment B2 as the end point of the stroke data in the one second rectangular region including the start point B2S, the one stroke data including the start point of the stroke data before dividing and the end point is created. Additionally, considering the end point B2E of the line segment B2 as the start point of the stroke data in the other second rectangular region including the end point B2E, the other stroke data including the end point of the stroke data before dividing and the start point is created.

In such a manner, the coordinate points composing one stroke data is divided into plural coordinate groups. Further, the second, fourth and fifth editing means also divide the coordinate points composing one stroke data into plural coordinate groups in such a manner. Accordingly one stroke data created at a single input of handwritten characters is divided to process as plural stroke data.

Further, according to the invention, the second editing means divides stroke data into plural coordinate groups, for example, in the above-mentioned manner, and then deletes the coordinate group selected by designation by the indicating means. Accordingly, one stroke data created at a single input of handwritten characters can be divided and the stroke data of characters designated by an operator can be selectively deleted, resulting in improving the operability.

Further, according to the invention, the third editing means adds the pen up line segment E to the end of the stroke data C and additionally adds the stroke data D. The pen up line segment E is the line segment of a predetermined length in which the end point of the stroke data C is considered as the start point ES and the start point of the stroke data D as the end point EE. The length is selected so that, for example, the characters of the stroke data C and the characters of the stroke data D can be continuously displayed. In such a manner, the stroke data created at different inputs of handwritten characters can be processed as one stroke data with the result that the operability is remarkably improved.

Further, according to the invention the third editing means creates one stroke data by conforming the size of the rectangular region including each of two stroke data to each other. Accordingly the characters of the two stroke data can be displayed in a conformed size.

Further, according to the invention, the third editing means creates one stroke data by conforming the attribute data of two stroke data. The stroke data includes attribute data indicating the width and type of character line. Accordingly the two stroke data can be displayed in a conformed attribute.

Further, according to the invention, the fourth editing means, after dividing stroke data into two stroke data F and G of two coordinate groups, for example, in the above-mentioned manner, creates the pen up line segment H, adds the created line segment H to the end of the stroke data F, and additionally adds the stroke data G. The pen up line segment H is the line segment of a predetermined length, in which the end point of the stroke data F is the start point HS and the start point of the other stroke data G is the end point HE. In such a manner, the stroke data into which a blank was inserted can be processed as one stroke data with the result that the operability is remarkably improved.

Further, according to the invention, the fifth editing means, after dividing stroke data into two stroke data I and J of two coordinate groups, for example, in the above-mentioned manner, creates the pen up line segment L, adds the created pen up line segment L to the end of the stroke data I, and additionally adds the stroke data K to form the stroke data M. The pen up line segment L is the line segment of a predetermined length, in which the end point of the stroke data I is the start point LS and the start point of the stroke data K to be inserted is the end point LE. The length is selected so that, for example, the characters of the stroke data I and the characters of the stroke data K can be continuously displayed.

Next the pen up line segment N is created, which is added to the end of the stroke data M, and additionally the stroke data J is added. The pen up line segment N is the line segment of a predetermined length, in which the end point of the stroke data M is the start point NS and the start point of the other stroke data J is the end point NE. The length is selected so that, for example, the characters of the stroke data M and the characters of the stroke data J can be continuously displayed. In such a manner, the stroke data created at different inputs of handwritten characters can be inserted to be processed as one stroke data with the result that the operability is remarkably improved.

Thus, according to the invention, one stroke data is divided and handled as plural stroke data, and part of one stroke data can be moved or copied and displayed. Moreover, part of one stroke data can be erased. Still more, two stroke data can be handled as one stroke data, and can be simultaneously moved or copied, and displayed. It is further possible to insert and display a blank region in one stroke data. In this way, the input/display apparatus for handwritten characters of the invention can freely edit input handwritten characters, and is hence very convenient. Therefore, editing process is easy, and time and labor required for processing can be curtailed.

BRIEF DESCRIPTION OF THE DRAWINGS

Other and further objects, features, and advantages of the invention will be more explicit from the following detailed description taken with reference to the drawings wherein:

FIG. 18 is a diagram showing stroke data display coordinates table of the stroke data to be divided;

FIGS. 19A, 19B are diagrams showing respective stroke data display coordinates tables of divided stroke data A and stroke data B;

FIGS. 25A, 25B are diagrams showing respective stroke data display coordinates tables of two stroke data to be combined;

FIG. 26 is a diagram showing stroke data display coordinates table of combined stroke data;

DETAILED DESCRIPTION OF THE PREFERRED EMBODIMENTS

Figure 1:
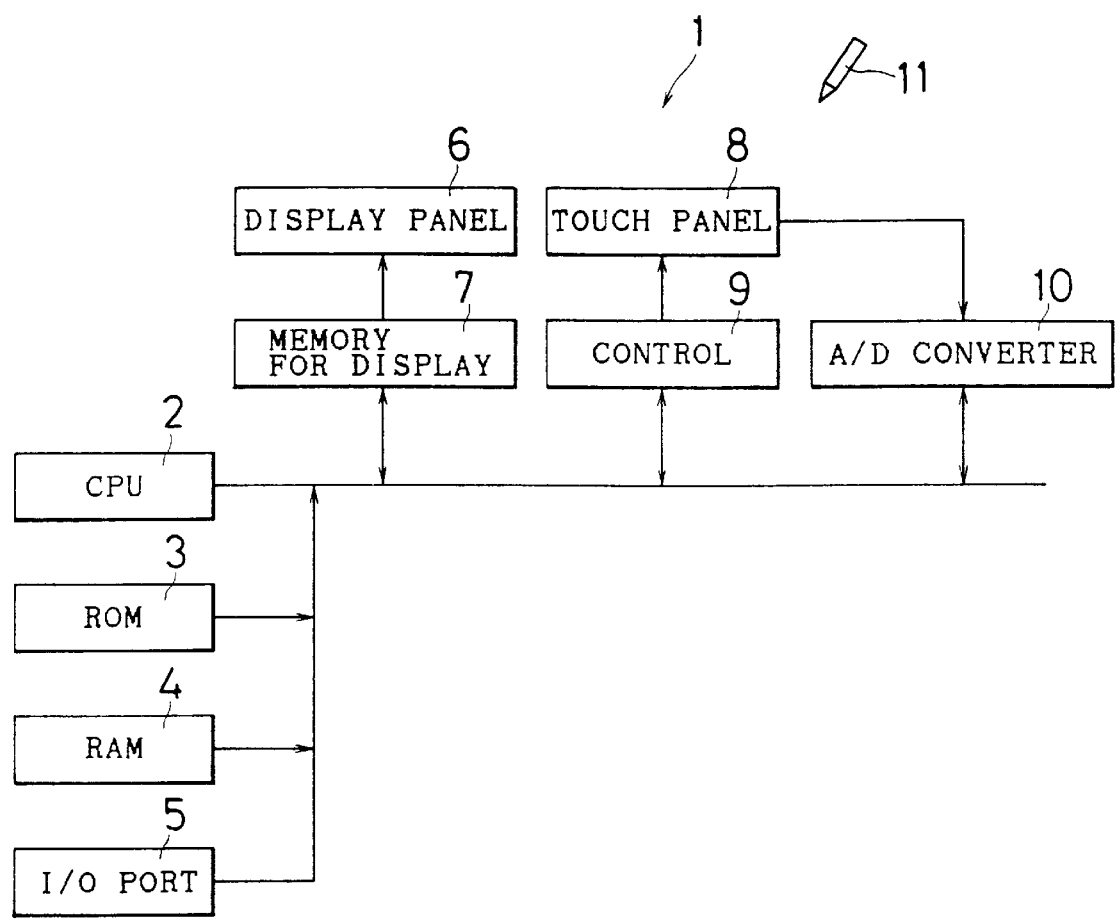
FIG. 1 is a block diagram showing a constitution of an handwritten character input/display apparatus 1 of an embodiment of the invention.

Now referring to the drawings, preferred embodiments of the invention are described below.

FIG. 1 is a block diagram showing the electric structure of the hand written character input/display apparatus 1 for handwritten characters which is an embodiment of the present invention. The handwritten character input/display apparatus 1 is constructed by including a central processing unit (hereinafter referred to as "CPU") 2, a read only memory (hereinafter referred to as "ROM") 3, a random access memory (hereinafter referred to as "RAM") 4, an I/O (input/output) port 5, a display panel 6, a memory 7 for display, a touch panel 8, a control circuit 9, an A/D (analog/digital) converter 10 and an input pen 11.

The CPU 2 controls the motion of the handwritten character input/display apparatus 1 according to the program written in the ROM 3. In the ROM 3, a readout program of input position, a data storing/readout program for processing into stroke data to be described later and program for normalization, for example, are stored in advance. Instead of the ROM 3, a program may be installed in a memory device such as magnetic disk device, and when required the program may be written into the reading RAM from the disk device, and the program may be executed. The RAM 4 is used in working area such as program saving region, data saving region, and buffer of input data. The I/O port 5 is used as communication port.

In the memory 7 for display, data to be displayed on the display panel 6 realized, for example, with a liquid crystal display element is written. The control circuit 9 controls the voltage to be applied to the touch panel 8 stacked on the display panel 6. As the touch panel 8, for example, a panel of a transparent resistance film type is selected and the prescribed voltage is applied respectively in the X-axis direction and in the Y-axis direction of the orthogonal coordinates set in advance on the input surface so as to output analog coordinate signals representing the coordinate point indicated with the input pen 11 which is the predetermined indicating means. The A/D converter 10 converts the analog coordinate signals into digital signals available for processing by the CPU 2.

Unless otherwise specified, the inputting motion made by the operator in this embodiment is performed by indicating the input surface of the touch panel 8 with the input pen 11. The light transmitting touch panel 8 of a resistance film type having translucency is constructed by forming resistance films realized with ITO (indium tin oxide) on a pair of flexible and translucent printed circuit boards or the like and disposing the resistance films in a way to oppose each other at a certain distance from each other. To the resistance film on one side, the prescribed voltage is applied. This applied voltage varies continuously from the input terminal side to the output terminal side. The resistance film on the other side, which is not grounded, is used for detection of voltage.

When the touch panel 8 is touched with the input pen 11, the resistance films at the touched position get in contact with each other and voltage is detected from the side of the other resistance film. Putting the direction of input and output terminals of the resistance film on one side as, for example, the x-axis direction on the orthogonal coordinates, this voltage becomes a value expressing the coordinate point in the X-axis direction. In the same way, when a prescribed voltage is applied in the Y-axis direction orthogonal to the X-axis direction on the orthogonal coordinates and a voltage is detected from the side of the resistance film on one side, the coordinate point inputted with pen in the Y-axis direction can be obtained.

By switching those motions at the prescribed timing, the coordinate point by pen input is detected as required. In the coordinates set on the input surface of the touch panel 8, the left top on the input surface is taken as the reference point and an X-axis is set in the right direction while a Y-axis is set in the downward direction. In this embodiment, explanation is given of the example of the touch panel 8 of a resistance film type but the touch panel 8 is not limited to a resistance film type and it can also be of either an electromagnetic induction type or a static induction type.

On the display surface of the display panel 6, orthogonal coordinates are set in advance. When some pen input has been made in the input/display area 20 for characters on the screen to be described below, a plurality of coordinates points agreeing with the plurality of coordinates points sampled with pen input of the touch panel 8 are selected and displayed first. Next, the plurality of sampled coordinates points of the touch panel 8 are changed into image data and the stroke data obtained by submitting those image data to processing for turning into stroke data are normalized and displayed in the prescribed size at the prescribed display position of the display panel 6. At that time, the display of the display panel 6 agreeing with the sampled coordinates points is erased. Moreover, when some pen input has been made in the display position somewhere other than the input/display area for characters, for example, in the display position of various buttons, operations corresponding to the indicated key are executed.

Figure 2:
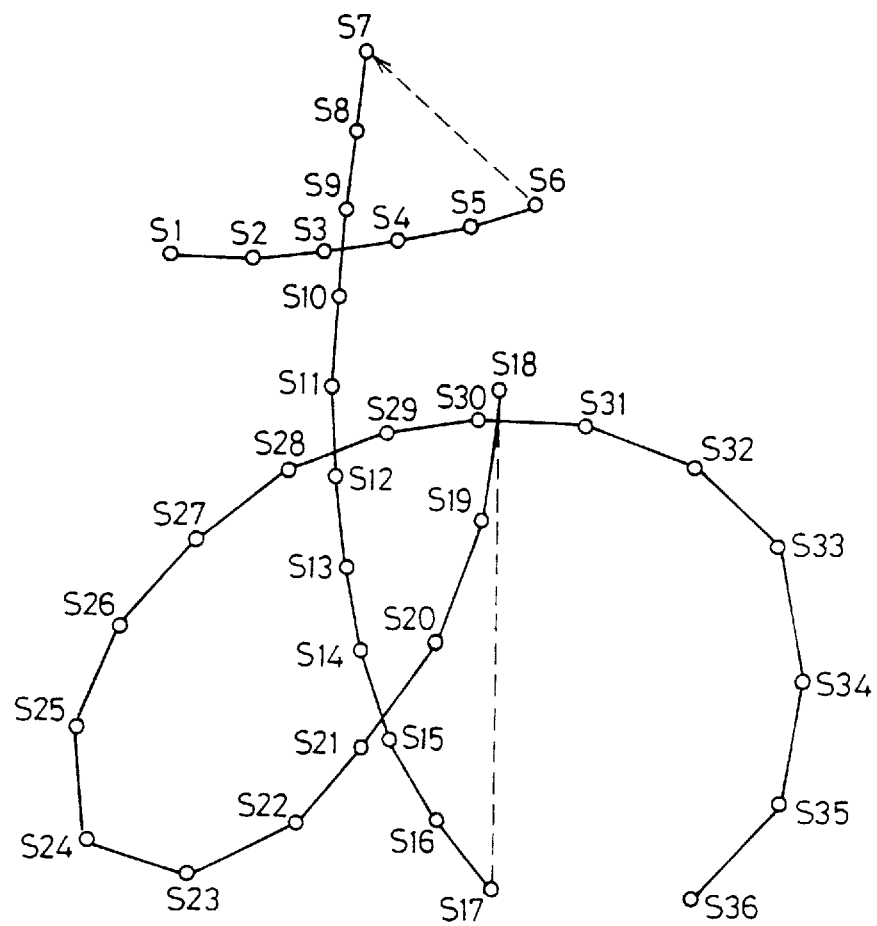
FIG. 2 is a diagram for explaining an example of stroke data.

FIG. 2 is a diagram for explaining stroke data. For example, a character as shown in FIG. 2 is written on the touch panel 8 of the handwritten character input/display apparatus 1, the coordinate values of the position of the pen 11 at its XY coordinates are obtained in the above procedure. That is, when stroking along the written character, coordinate values of coordinate points S1 to S36 are sequentially obtained. These coordinate values consist of contact-free moving of the pen 11 and touch panel (called pen up hereinafter), and moving while contacting with the pen 11 (called pen down hereinafter). For example, all moves of coordinate points S1, S2, S3 are pen down, and moves from coordinate point S6 to coordinate point S7 are pen up. A set of such coordinate data and additional information when moving the coordinates such as up and down of pen 11 is called stroke data. By storing the stroke data, the move of the pen 11 can be easily reproduced on the display panel 6. Reproduction on display is moving along the coordinate points S1 to Sn by straight line, that is, it is to approximate traces of handwritten character by straight line.

The coordinate values of coordinate points S1 to Sn are expressed either by absolute coordinates defining a certain point as the origin (hereinafter called absolute coordinate expression), or by difference from preceding coordinate points (hereinafter called relative coordinate expression). For example, when coordinate point Sm is present at a position of +3 in the X-coordinate and −2 in the Y-coordinate from coordinate point Sm−1, it is a vector expression having a moving stroke of +3 in the X-coordinate and −2 in the Y-coordinate in the relative coordinate expression. The relative coordinate expression is easier to magnify and reduce as compared with the absolute coordinate expression, and it is generally employed widely. The absolute coordinate expression and relative coordinate expression can be mutually transformed. The invention does not depend on the method of expression of coordinate values of stroke data.

Stroke data can be displayed in a rectangle (quadrangle) 31 for circumscribing the stroke data. This rectangle 31 is expressed as rectangular region of stroke data, and the dimensions of the rectangle 31 in X and Y direction may be stored by adding to the stroke data. The origin of coordinates stroke data is often set at one of four corners of the rectangle 31.

Figure 3:
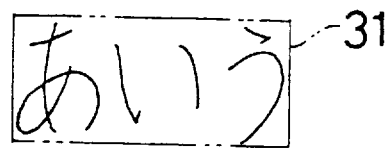
FIG. 3 is a diagram showing a rectangular region 31 of stroke data.
Figure 4:
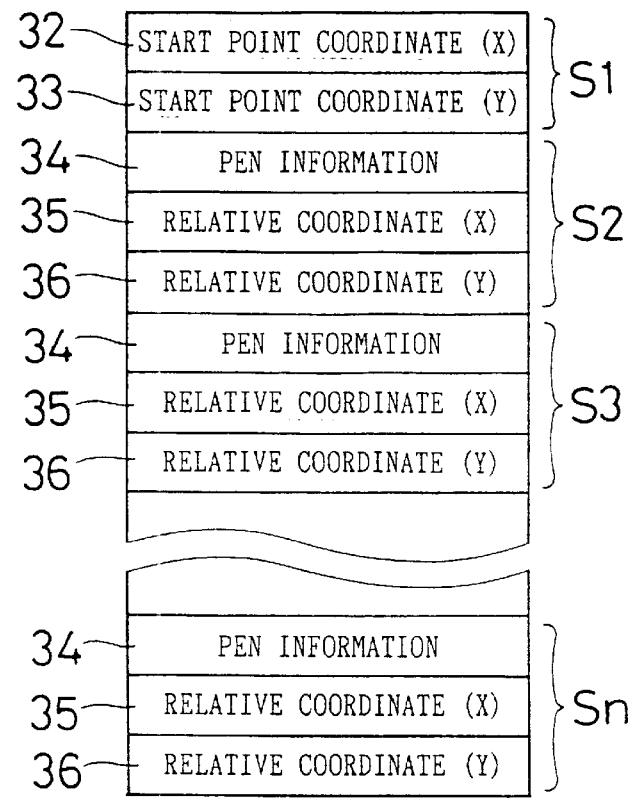
FIG. 4 is a diagram showing a data composition example of stroke data.

FIG. 4 is a diagram showing a data composition example of stroke data. Start point coordinate (X) 32 and start point coordinate (Y) 33 show coordinates of the start point of stroke data. The coordinates show, by defining the origin preliminarily, for example, so as to show the coordinates on the XY coordinates on the origin of the lower left corner of the rectangular region of the stroke data shown in FIG. 3, the moving length of the pen 11 to the start position by departing from the input surface, from this origin. By the start point coordinates (X), (Y) 32, 33, the coordinate point S1 shown in FIG. 2 is specified. Pen information 34 is composed of information whether the pen 11 moves away from the touch panel 6 or moves in contact with the input surface, information showing thickness of the pen, or information showing final coordinate point. The relative coordinate (X) 35 and relative coordinate (Y) 36 show the relative moving length of the pen 11 from one coordinate point before in the X-direction and Y-direction as converted to the rectangular coordinates of the input surface. The coordinate points S2 to Sn are specified by the pen information 34 and relative coordinates (X), (Y) 35, 36.

At the end of stroke data, a mark (flag) showing that this coordinate point is final is set in the pen information 34. In the case of data in absolute coordinate expression, meanwhile, only the coordinates are expressed by the coordinate values on the XY coordinates with the origin at the lower left corner of the rectangular region of the stroke data.

Figure 5:
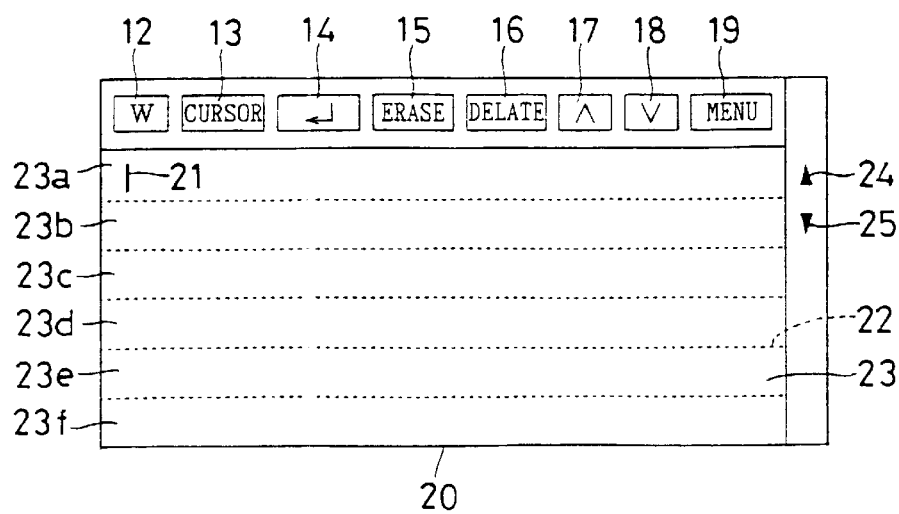
FIG. 5 is a diagram showing an initial screen 26 of the handwritten character input/display apparatus 1.

FIG. 5 is a plan view showing the initial picture displayed on the display panel 6. FIGS. 6A to 6D are plan views showing in progressive steps an example of the display image at the time of inputting and displaying of handwritten characters. In the initial picture 26, a plurality of buttons 12 to 19, 24, 25 are displayed in addition to the input/display area 20 for characters. In the input/display area 20 for characters, a plurality of ruled lines 22 are displayed at equal intervals. A line 23 exists between adjacent ruled lines 22 and a plurality of lines 23 are formed with a plurality of ruled lines 22. At the forefront position of the first line 23a (left top of the input/display area 20 for characters in the picture in FIG. 5), the cursor 21 indicating the input display position is displayed. In the input/display area 20 for characters, characters are input in handwriting using the input pen 11. The image data inputted in handwriting is submitted to processing for turning into stroke data and then submitted to normalization to be inputted in the right direction in the picture in FIG. 5 from the position where the cursor 21 is displayed.

Figure 6A:
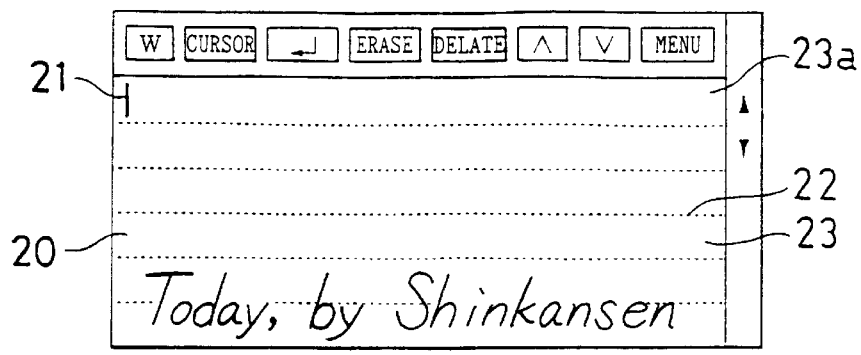
FIGS. 6A to 6D are diagrams explaining input operations of the handwritten character input/display apparatus 1.

For example, when a phrase "today, by Shinkansen" is inputted in the input/display area 20 for characters by using the input pen 11, the characters inputted in the input position are displayed as shown in FIG. 6A. This is executed by detecting the input position with the touch panel 8 and selecting and displaying the display position of the display panel 6 corresponding to the input position detected.

Figure 6B:
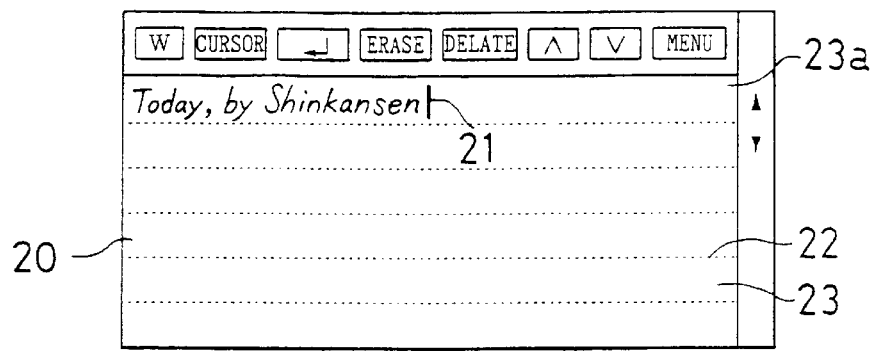

When, after inputting characters in handwriting, for example, the W button is indicated with the input pen 11, the image data is submitted to processing for turning into stroke data and also submitted to normalization, and the characters are displayed in the right direction in the picture in FIG. 6B from the position of the cursor 21 displayed in the forefront position as shown in FIG. 6B. The cursor 21 is displayed after the characters displayed. Moreover, the characters which were displayed in the input position are erased. The processing for turning into stroke data is one made for reducing the data volume by detecting the necessary image data only from among the sample image data. In addition, normalization means processing for converting characters inputted in handwriting to a size corresponding to the width of the line 23.

Figure 6C:
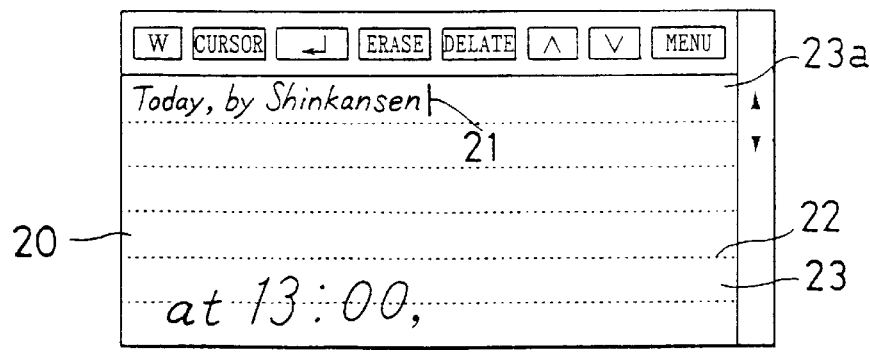
Figure 6D:
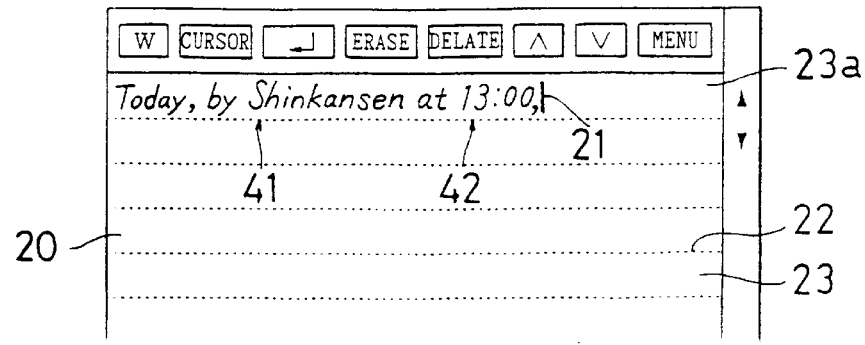

Next, when characters are inputted in handwriting as "at 13:00" in the same way, the inputted characters are displayed in the input position as shown in FIG. 6C. When the W button 12 is indicated next, the image data is submitted to processing for turning into stroke data and also submitted to normalization, and the characters are displayed in the right direction in the picture in FIG. 6 from the position of the cursor 21 as shown in FIG. 6D. The cursor 21 is displayed after the characters displayed. Moreover, the characters which were displayed in the input position are erased.

In this embodiment, the image data inputted during the period from the end of processing for turning into stroke data to the next processing for turning into stroke data is treated as forming one block data. In the case where characters are inputted in handwriting in the initial picture 26, the image data inputted during the period from the showing of the initial picture to the first processing for turning into stroke data is treated as forming one block data. In the examples of input of characters mentioned above, "today, by Sinkansen" and "at 13:00" become single block data respectively and are displayed as block 41 and block 42. The processing for turning into stroke data and the processing for normalization are performed for each block.

In the examples mentioned before, processing for turning into stroke data and processing for normalization are performed by indicating the W button 12. When the W button 12 is not indicated, however, processing for turning into stroke data and processing for normalization are performed by measuring the time after the end of input in handwriting when there is no input even with the passing of a prescribed time. Moreover, processing for turning into stroke data and processing for normalization are performed when the inputted image data is away from the image data inputted immediately before by no less than the predetermined distance.

When, after indicating the cursor button 13 with the input pen 11, a desired position in the input/display area 20 for characters is indicated, the cursor 21 moves to the indicated position. When, after indicating the line feed button 14 with the input pen 11, a desired position inside the block displayed in the input/display area 20 for characters is indicated, a line feed code is inputted before the block data of the indicated block and a line feed is made at that position. When, after indicating the eraser button 15 with the input pen 11, a desired position inside the block displayed in the input/display area 20 for characters is indicated, the block data of the indicated block is erased. The erased area becomes blank. Here, the eraser button 15 is converted to the pencil button which is not illustrated.

When, after indicating the delete button 16 with the input pen 11, a desired position inside the block displayed in the input/display area 20 for characters is indicated, the block data of the indicated block is deleted. The blocks after the erased block are displayed by eliminating the erased space. In the case where there is no block to display in the position indicated by the input pen 11 after indication by the input pen 11 of the delete button 16, a blank of the predetermined size is deleted. Here, the delete button 16 is converted to the pencil button which is not illustrated. When the pencil button is indicated with the input pen 11, the eraser button 15 or the delete button 16 appears to enable input in handwriting of characters again.

When the registration button 17 is indicated with the input pen 11, a plurality of block data and line feed code, etc. are registered as an independent data in the RAM 4 together with the date of input, for example. After the registration is over, the independent data registered in the immediately previous position is read out and displayed in the input/display area 20 for characters. When there is no independent data in the immediately previous position, no processing is made. When the registration button 18 is indicated with the input pen 11, a plurality of block data and line feed code, etc. are registered as an independent data in the RAM 4 together with the date of input, etc. After the registration is over, the independent data registered in the next position is read out and displayed in the input/display area 20 for characters. When there is no independent data in the next position, the initial picture 26 is displayed.

When the upper button 24 or the lower scroll button 25 is indicated with the input pen 11, the line 23 in the input/display area 20 for characters is sequentially fed and displayed. Namely, the input/display area 20 for characters is constructed with a plurality (6 in this embodiment) of lines 23a to 23f as shown in FIG. 5 and, if the upper scroll button 24 is indicated with the input pen 11 when the input/display area 20 for characters is being displayed, for example, the input/display area 20 for characters constructed with 6 lines or the 2nd line 23b to the 6th line 23f and the 7th line following the 6th line 23f, is displayed. When the button 24 is indicated in succession, the input/display area 20 for characters constructed with the 3rd line 23c to the 8th line is displayed. Moreover, when the lower scroll button 25 is indicated when the input/display area 20 for characters constructed with the 2nd line 23b to the 7th line is being displayed, the input/display area 20 for characters constructed with the first line 23a to the 6th line 23f is displayed. The number of lines for one scrolling may be either 1 line or 2 or more lines.

Concerning each stroke data, by storing the size and place of display in separate memory places, when specifying specific stroke data by touching the touch panel 6 by the pen 11, it is possible to judge which stroke data is displayed in the touched position from the touched coordinate values. The data used in such judging action is called the stroke data display coordinate table.

Figures 7, 8:
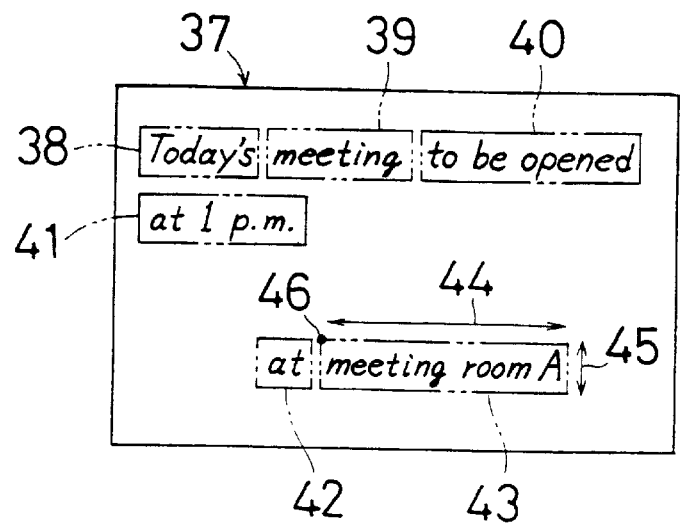
FIG. 7 is a diagram showing a display example of stroke data.
FIG. 8 is a diagram showing an example of stroke data display coordinates table.
Figures 9, 10:
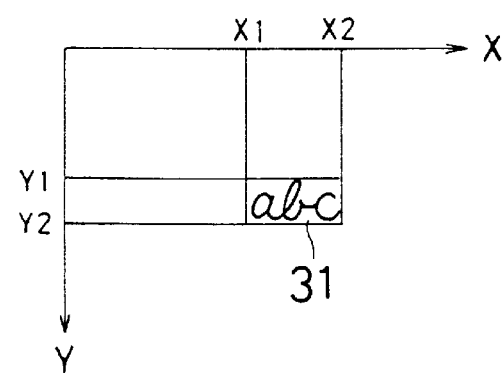
FIG. 9 is a diagram showing other example of stroke data display coordinates table.
FIG. 10 is a diagram explaining procedure of creating stroke data display coordinates table shown in FIG. 9.

Suppose plural stroke data are displayed in the display screen 37 as shown in an display example in FIG. 7. As an example of stroke data display coordinate table, as shown in FIG. 8, coordinate position 46, X-direction size 44, and Y-direction size 45 displayed in each displayed stroke data are stored. The coordinate position 46 is an upper left coordinate point of rectangular regions 38 to 43 expressed in the X,Y direction size 44, 45. As shown in FIG. 9, X-coordinate X1 at right end, X-coordinate X2 at left end, Y-coordinate Y1 at upper end, and Y-coordinate Y2 at lower end of the rectangular region 31 (see FIG. 10) displaying stroke data are stored. By touching the touch panel with the pen 11, the coordinate values can be judged, and therefore the stroke data containing the coordinates touched by the pen can be easily specified on the basis of the stroke data display coordinate tables 47, 48.

Figure 11:
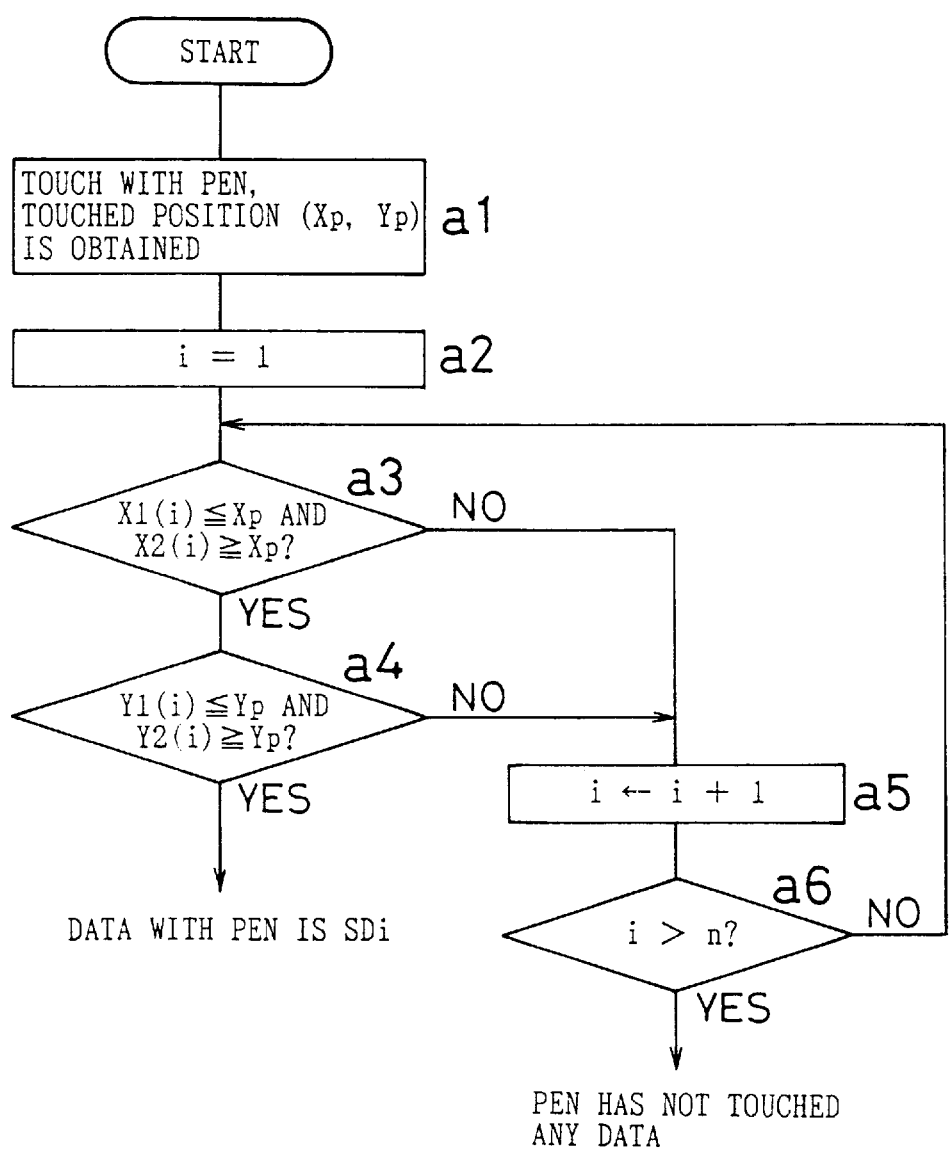
FIG. 11 is a flowchart for judging which is the stroke data touched by a pen.

FIG. 11 is a flowchart for judging which stroke data has been touched by the pen. In this flowchart, an example of using the stroke data display coordinate table 48 shown in FIG. 9 is explained. At step s1, the coordinates Xp, Yp touched by the pen are obtained. At step a2, parameter i=1 is set.

At step a3, it is judge if coordinate Xp is contained in a range from left end to right end of the i-th stroke data or not. The process moves to step a4 when contained, or to step a5 when not contained.

At step a4, it is judge if coordinate Yp is contained in a range from upper end to lower end of the i-th stroke data or not. When contained, the instructed stroke data is judged to be data DSi, or the process moves to step a5 when not contained.

At step a5, 1 is added to parameter i, and the process moves to step a6. At step a6, it is judged if parameter i is larger than number n of the displayed stroke data. If judged negatively, the process returns to step a3, and if judged affirmatively, it is judged that the pen 11 does not touch any stroke data.

In this way, if the pen 11 touches any stroke data, its stroke data number can be obtained. The instructed stroke data number is supposed to be SDn, the display coordinates to be (xn, yn), the size of the rectangular region in X-direction to be Wxn, and the size in Y-direction to be Wyn.

FIG. 12 is a diagram for explaining a case of dividing stroke data into two sections. In the case of characters written horizontally, when necessary to divide, it is often needed to divide into right and left side, and an example of dividing laterally is described below. For the sake of simplicity of explanation, each stroke data is supposed to be displayed in the input size, and the coordinates and size to be displayed in the state of original data. If the display is magnified or reduced from the original data in order to standardize the display size, calculation is possible by taking into consideration the magnifying rate or reducing rate.

Figure 12A:
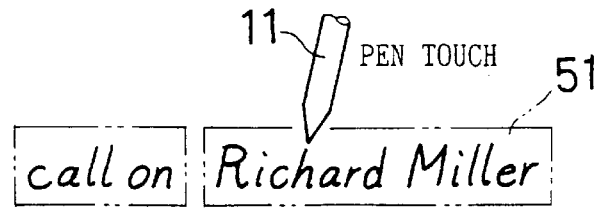
FIGS. 12A to 12C are diagrams showing operating procedure when dividing stroke data into two.

First, the user specifies the stroke data to be divided. Several methods of specifying may be considered, and herein, as shown in FIG. 12A, the top of the display input screen displaying the stroke data 51 is touched by the pen 11. At this time, the rectangular region 52 containing the specified stroke data 51 is, for example, highlighted, so that the completion of specifying may be seen by the user.

Figure 12B:
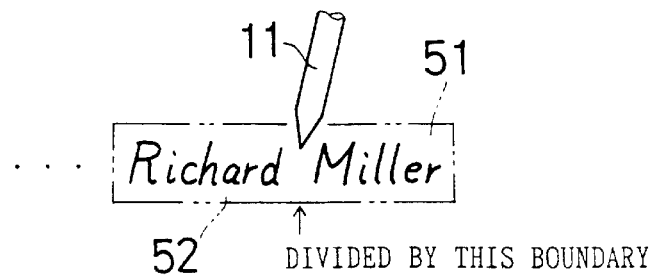
Figure 12C:
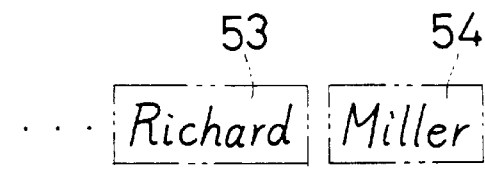

Consequently, as shown in FIG. 12B, by manipulation of touching the boundary portion to be divided on the display input screen of the specified stroke data 51 by the pen 11, the stroke data 51 can be divided into two stroke data 53, 54 as shown in FIG. 12C. The dividing boundary line is a vertical line including the touched coordinates.

Figure 13:
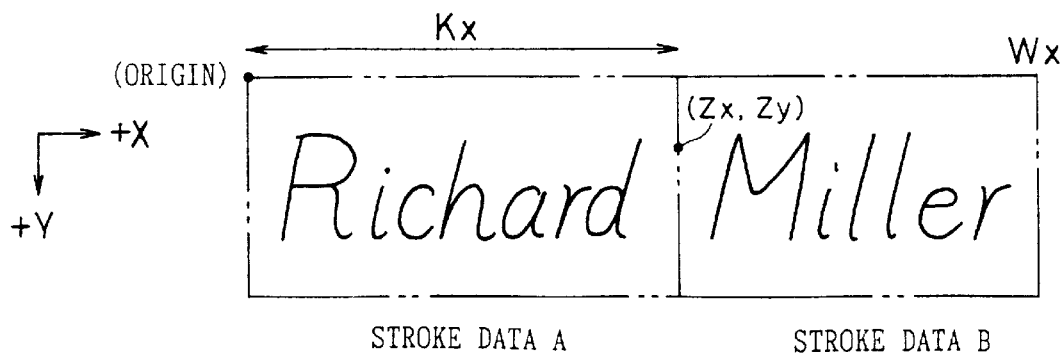
FIG. 13 is a diagram showing operating procedure when dividing stroke data into two.

Referring now to FIG. 13, the coordinates (Zx, Zy) touched for specifying the division boundary line can be judged on the basis of the signal from the touch panel in the same procedure as above. According to the coordinates (Zx, Zy) and the stroke data display coordinate tables 47, 48, the relative X-coordinate Kx of the division boundary line from the origin of the rectangular region 52 can be easily determined as $$Kx=xn-Zx.$$

Therefore, supposing the origin to be in the upper left corner of the rectangular region 52 of the objective stroke data 51, it is divided into stroke data A from 0 to Kx, and stroke data B from Kx to Wx, relating to the X-axis direction. Herein, Wx is the size of the objective stroke data 51 in the X-direction of the rectangular region 52.

(Division of stroke data)

Figure 14A:
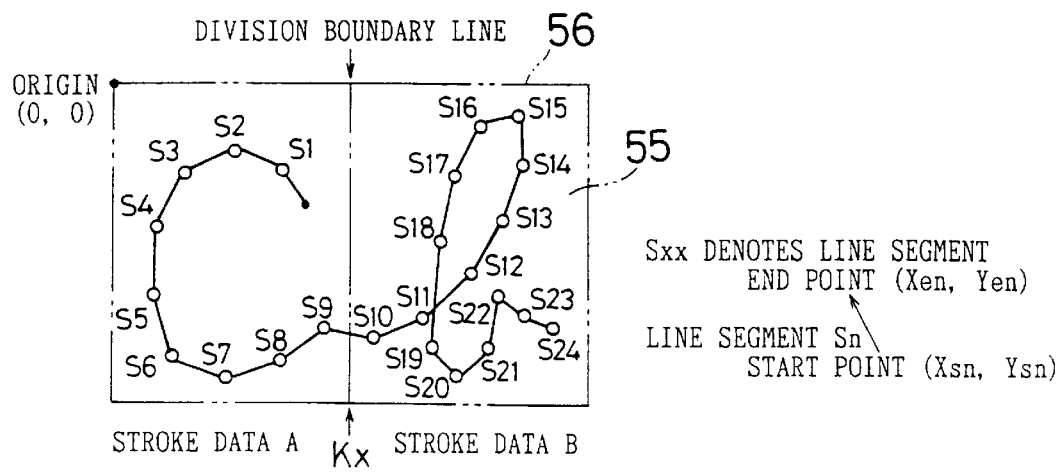
FIGS. 14A, 14B are diagrams showing operating procedure when dividing stroke data into two.

Referring next to FIG. 14, a specific example of dividing stroke data into stroke data A and stroke data B is described below. Among plural line segments composing stroke data, there is only one line segment crossing the boundary line to be divided by pen touch in one case, and there are a plurality in other case, and the single case is described first. Incidentally, if each coordinate of stroke data is expressed by the relative coordinate from the preceding coordinate, the absolute coordinate is determined by defining the origin in the upper left corner of the rectangular region of the stroke data.

First, among line segments composing stroke data 55, a line segment intersecting with the boundary line Kx is searched. That is, taking note of each absolute X-coordinate of start point (Xsn, Ysn) and end point (Xen, Yen) of line segment Sn, the line segment Sn satisfying $$Kx-Xsn>0, \text{ and } Xen-Kx>0,$$

or the line segment Sn satisfying $$Kx-Xen>0, \text{ and } Xsn-Kx>0$$

is searched. In the case of stroke data 55 shown in FIG. 14A, it corresponds to line segment S10.

Figure 14B:
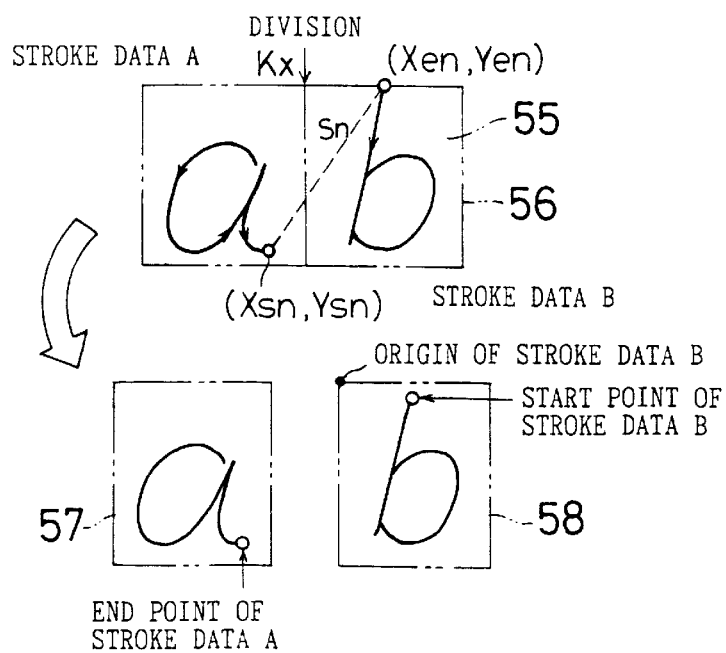

As shown in FIG. 14B, when the searched line segment Sn is pen up, the start point (Xsn, Ysn) of the line segment Sn is the end point of stroke data A, and its end point (Xen, Yen) is start point of stroke data B. Rectangular regions 57, 58 of stroke data A, B are newly created. The start point (Xen, Yen) of stroke data B must be converted to the coordinate values having the origin in the stroke data B because the upper left corner of the rectangular region 58 of the newly created stroke data B is the origin. The coordinates may be calculated as follows:

X-coordinate of start point of stroke data B=Xen−Kx

Y-coordinate of start point of stroke data B=Yen

When the line segment Sn crossing the boundary line Kx, and end point of stroke data A and start point of stroke data B are known, the relative coordinate data may be used again. The data after the line segment S (n+1) as constituent element of stroke data B may be directly used as data of stroke data B as far as the coordinate values are relative.

Figure 15A:
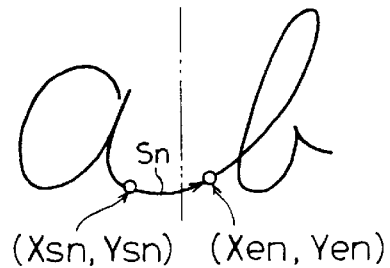
FIGS. 15A to 15C are diagrams showing operating procedure when dividing stroke data into two.
Figure 15B:
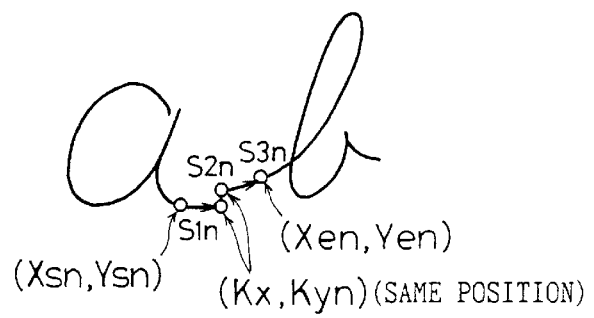

As shown in FIG. 15A, when the line segment Sn is pen down, this line segment Sn is divided into three line segments as shown in FIG. 15B for the sake of convenience, that is:

pen down line segment S1n of start point (Xsn, Ysn) and end point (Kx, Kyn)

pen up line segment S2n of start point (Kx, Kyn) and end point (Kx, Kyn) (start point and end point are same position)

pen down line segment S3n of start point (Kx, Kyn) and end point (Xen, Yen)

Figure 15C:
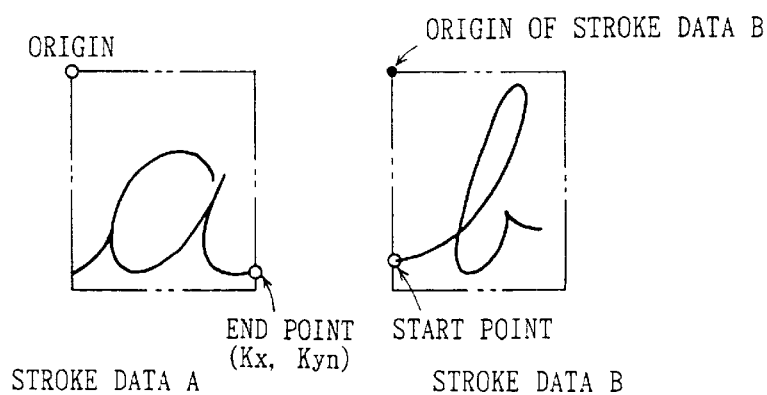

The coordinates are absolute coordinates. Herein, the coordinate Kyn is determined by:

$$Kyn=Ysn-(Ysn-Yen)\times(|Kx-Xsn|/|Xsn-Xen|)$$

where (Kx, Kyn) denote coordinates of the intersecting place of line segment and boundary line. Next, assuming the pen up line segment S2n to be a line segment crossing the division boundary line Kx, same as in the case of pen up line segment, the coordinates (Kx, Kyn) are processed as end point of stroke data A and start point of stroke data B, and stroke data A and B are obtained as shown in FIG. 15C.

Figure 16:
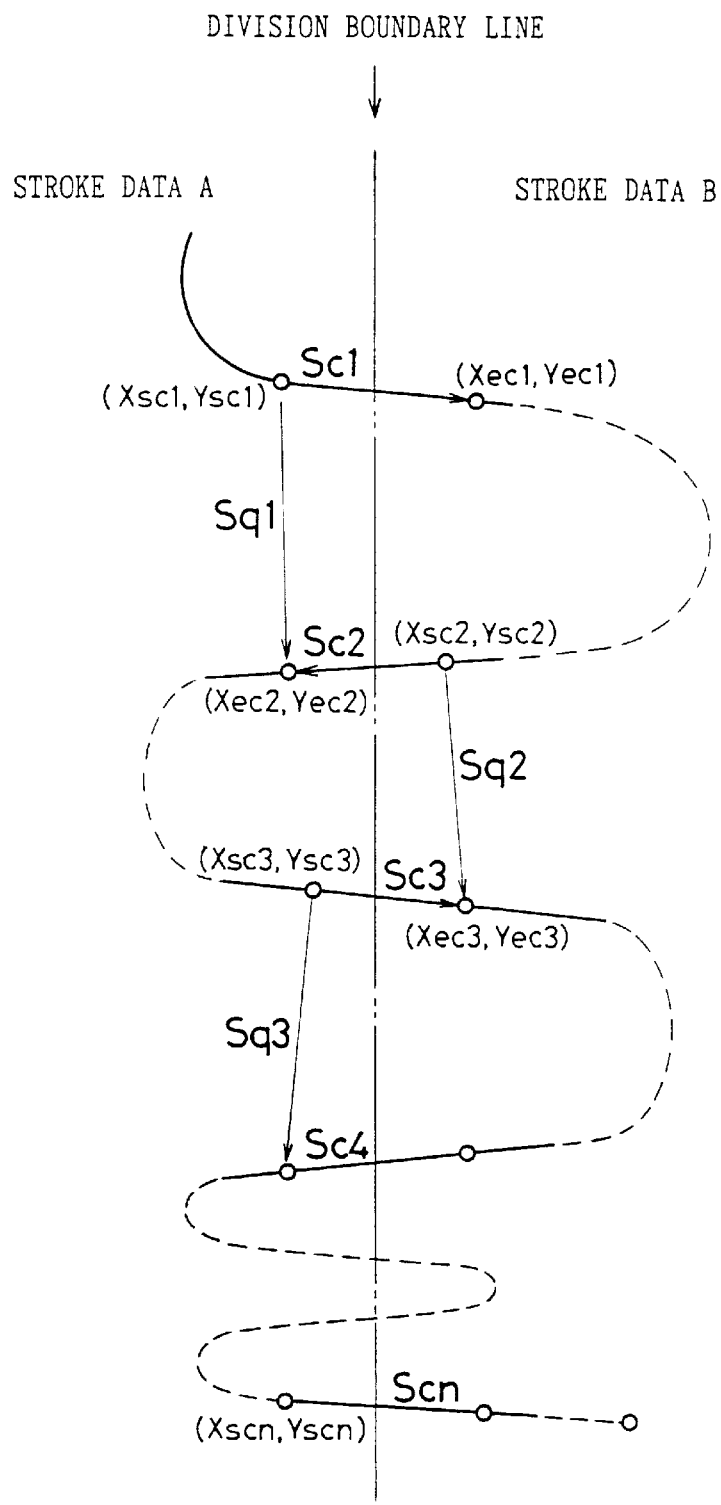
FIG. 16 is a diagram showing operating procedure when dividing stroke data into two.

FIG. 16 shows a case of a plurality of line segments crossing the division boundary line. The line segments are expressed by reference numerals Sc1, Sc2, ..., Scn. The system of coordinates may be either relative coordinates or absolute coordinates unless otherwise specified. In the example shown in FIG. 16, the crossing direction of boundary line is same in all odd-numbered line segments Sc1, Sc3, Sc5, etc., and same in all even-numbered line segments Sc2, Sc4, Sc6, etc.

The extent from line segment S0 to line segment S(c1-1) is processed as being belonging to the stroke data A side, and between line segment Sc1: start point (Xsc1, Ysc1) and end point (Xec1, Yec1), and line segment Sc2: start point (Xsc2, Ysc2) and end point (Xec2, Yec2), the data from line segment S(c1+1) to line segment S(c2-1) is processed as being belonging to stroke data B. Besides, in stroke data A, a new pen up line segment of line segment S11: start point (Xsc1, Ysc1) and end point (Xec2,Yec2)

is inserted. That is, the stroke data A is a line segment row of line segments S1 to S(c1-1), Sq1, S(c2+1), and so forth.

As for stroke data B, the data from line segment S(c1+1) to line segment S(c2-1) is data of stroke data B, and start point (Xec1, Yec1) is the start point of stroke data B. Next, as for line segment Sc2: start point (Xsc2, Ysc2) and end point (Xec2, Yec2)

line segment Sc3: start point (Xsc3, Ysc3) and end point (Xec3, Yec3)

the pen up line segment of line segment Sq2: start point (Xsc2, Ysc2) and end point (Xec3, Yec3)

is added next to the line segment S(c2-1) of stroke data B. That is, stroke data B is a line segment row of line segments S(c1+1) to S(c2-1), Sq2, S(c3+1), and so forth.

As for stroke data A, the data from line segment S(c2+1) to line segment S(c3-1) is data of stroke data A. That is, stroke data A is a line segment row of line segments S1 to S(c1-1), Sq1, S(c2+1) to S9c3-1). Next, as for line segment Sc3: start point (Xsc3, Ysc3) and end point (Xec3, Yec3)

line segment Sc4: start point (Xsc4, Ysc4) and end point (Xec4, Yec4)

the pen up line segment of line segment Sq3: start point (Xsc3, Ysc3) and end point (Xec4, Yec4)

is added next to the line segment S(c3-1) of stroke data A. That is, stroke data A is a line segment row of line segments S1 to S(c1-1), Sq1, S(c2+1) to S(c3-1), Sq3, S(c3+1), and so forth.

Moreover, as for stroke data B, data from line segment S(c3+1) to line segment S(c4-1) is data of stroke data B. Such processing is repeated up to line segment Scn.

Concerning the final line segment Scn: start point (Xscn, Yscn) and end point (Xecn, Yecn), the end point (Xenc, Yecn) is the final point of all strokes at the strong data side to which the point belongs.

In this processing, the stroke data can be divided into stroke data row A: S1 to S(c1-1), Sq1, S(c2+1) to S(c3-1), Sq3, S(c4+1), ..., and stroke data row B: S(c1+1) to S(c2-1), Sq2, S(d3+1), S(c4-1), Sq4, S(c5+1), ...

What is explained so far is the case of surpassing the boundary line in the pen up state, and in the case of surpassing the boundary line in pen down state, same as mentioned above, by dividing into three line segments, line segment S1n of start point (Xsn, Ysn) and end point (Kx, Kyn)

line segment S2n of start point (Kx, Kyn) and end point (Kx, Kyn) (pen up line segment with start point and end point at same position)

line segment S3n of start point (Kx, Kyn) and end point (Xen, Yen)

$$Kyn=Ysn-(Ysn-Yen)\times(|Kx-Xsn|/|Xsn-Xen|)$$

where (Kx, Kyn) are coordinate values at the intersecting place of line segment and boundary line, the data can be divided into stroke data A and stroke data B in the same process as above (see FIG. 15). The coordinates are absolute coordinates.

Figure 17:
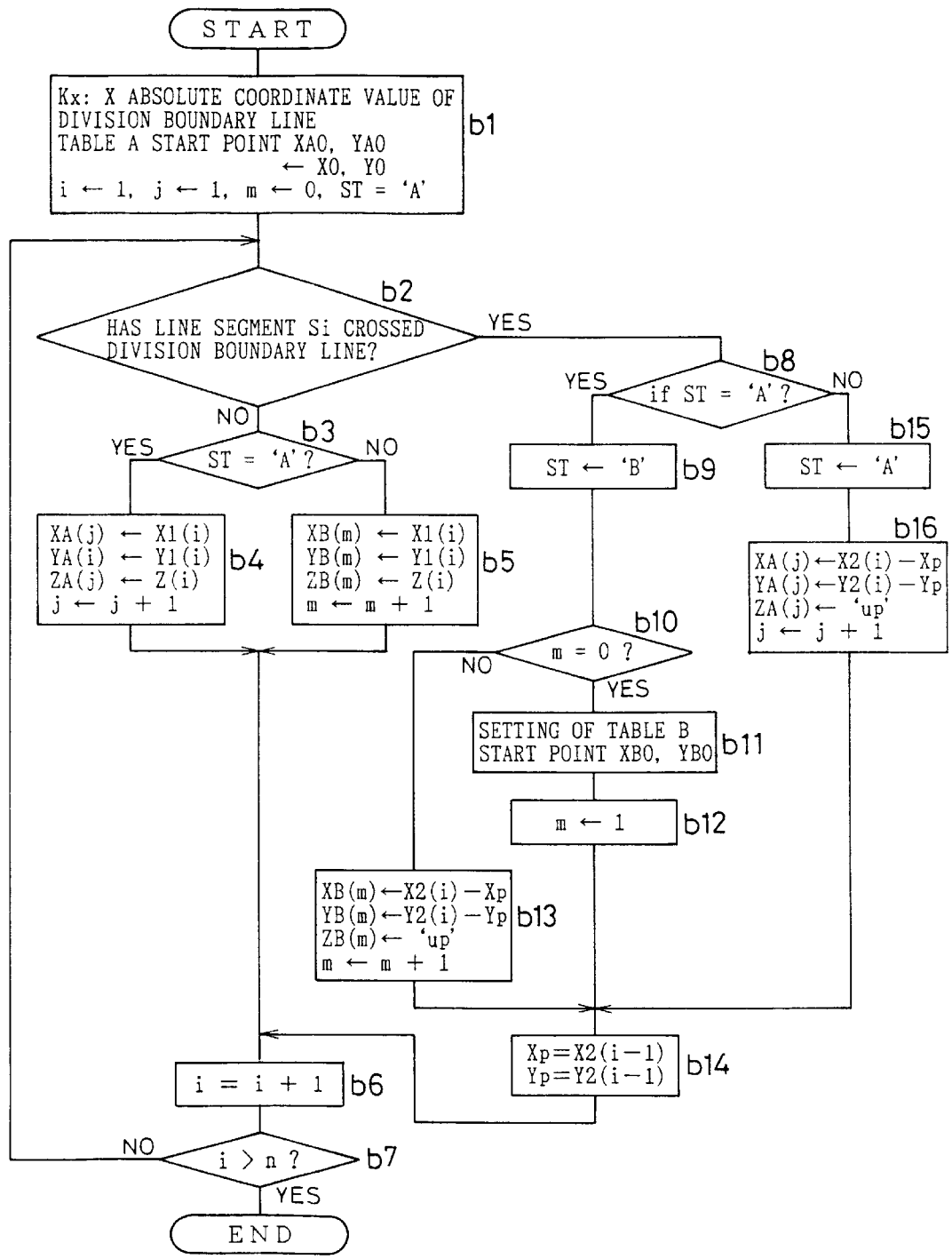
FIG. 17 is a flowchart explaining the process when dividing stroke data into two.

FIG. 17 is a flowchart explaining division process of stroke data. Herein, master stroke data shown in FIG. 18 is divided into stroke data A and stroke data B shown respectively in FIGS. 19A and 19B. In the master stroke data in FIG. 18, both numerical values of relative coordinates X1, Y1 and absolute coordinates X2, Y2 are prepared by prior processing for the ease of handling. The master stroke data in FIG. 18 is divided by boundary line Kx, crossing over the division boundary line Kx in the pen up state only, in the case explained below.

Step b1 is for initial setting. The X absolute coordinate value of the division boundary line is set in coordinate Kx. The start point XA0, YA0 of stroke data A is set at start point X0, Y0 of master stroke data. Parameters i, j are both set at 1, and parameter m is set at 0, and parameter ST showing to which data the stroke data belongs is set at A.

Figure 20:
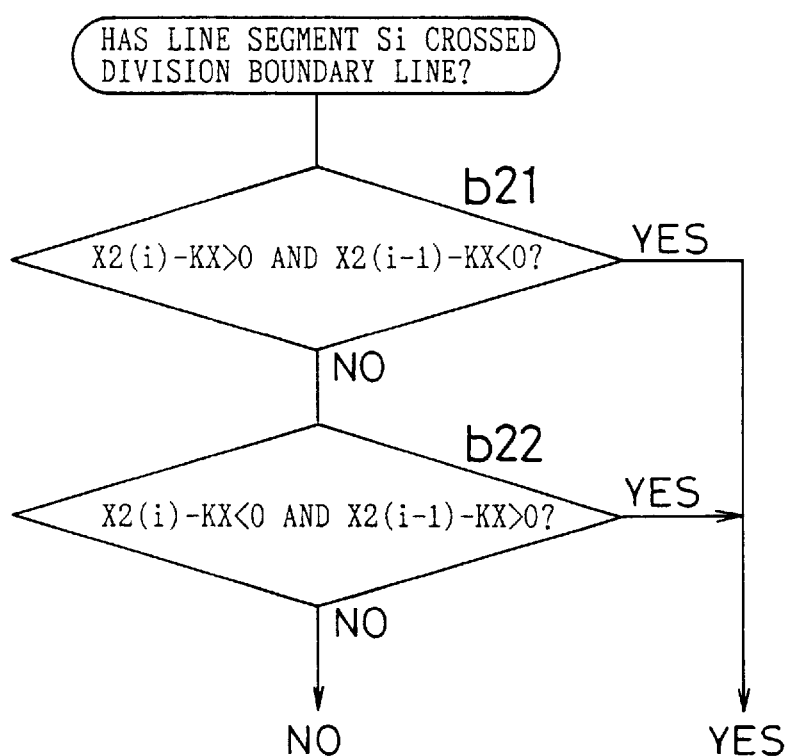
FIG. 20 is a flowchart showing detail of processing of step b2 in FIG. 17.

At step b2, it is judged if line segment Si has crossed the division boundary line or not. The process moves to step b3 if not crossing, or advances to step b8 if crossing. Specific processing at step b2 is shown in FIG. 20. Referring to FIG. 20, at step b21, it is judged if the absolute coordinate value X2(i) of end point of line segment Si is greater than coordinate value Kx, and if the absolute coordinate value X2(i−1) of end point of line segment S(i−1) is smaller than coordinate value Kx. If judged affirmatively, it is estimated that the line segment Si has crossed the division boundary line. If judged negatively at step b21, the process moves to step b22. At step b22, it is judged if the absolute coordinate value X2(i) of end point of line segment Si is smaller than coordinate value Kx, and if the absolute coordinate value X2(i−1) of end point of line segment S(i−1) is greater than coordinate value Kx. if judged affirmatively, it is estimated that the line segment Si has crossed the division boundary line. If judged negatively, it is estimated that the line segment Si has not crossed the division boundary line.

Referring back to FIG. 17, at step b3, it is judged if parameter ST is A or not. If judged affirmatively, the process moves to step b4, and if judged negatively, the process moves to step b5.

At step b4, relative coordinate values X1(i), Y1(i) and pen information Z(i) of end point about line segment Si are stored respectively as relative coordinate values XA(j), YA(j), and ZA (j) of end point about line segment SAj for composing stroke data A, and 1 is added to parameter j, and the process moves to step b6.

At step b5, relative coordinate values X1(i), Y1(i) and pen information Z(i) of end point about line segment Si are stored respectively as relative coordinate values XB(m), YB(m), and ZB (m) of end point about line segment SBm for composing stroke data B, and 1 is added to parameter m, and the process moves to step b6.

At step b6, 1 is added to parameter i, and at step b7, it is judged if parameter i is greater than the number n of line segments for composing the master stroke data. If greater, the process is over, and if not greater, the process returns to step b2, and next line segment is processed similarly.

At step b2, if the line segment Si is crossing the division boundary line, the process moves to step b8, and it is judged if parameter ST is A or not. If parameter ST=A, the process moves to step b9, and if parameter ST is not A but B, the process advances to step b15.

At step b9, setting parameter ST=B, the process moves to step b10. At step b10, it is judged if parameter m is 0. If parameter m=0, the process moves to step b11, and if not parameter=0, the process moves to step b13. At step b11, the start point XB0, YB0 of stroke data B is set. More specifically, the value subtracting the coordinate value Kx from the absolute X-coordinate X2 (i) of end point of line segment Si is set at X-coordinate XB0 of start point of stroke data B, and absolute Y-coordinate Y2(i) of end point of line segment Si is set at Y-coordinate YB0 of start point. At step b12, parameter m is set at 1, and the process moves to step b14.

At step b10, if not parameter m=0, the process moves to step b13. At step b13, relative coordinates XB(m), YB(m), and pen information ZB(m) of end point about line segment SBm for composing stroke data B are set, 1 is added to parameter m, and the process moves to step b14. More specifically, the relative X-coordinate value XB(m) of end point of line segment SBm is set at a value of subtracting the coordinate value Xp set at subsequent step b14 from the absolute X-coordinate value X2(i) at end point of line segment Si. The relative Y-coordinate value YB(m) of end point of line segment SBm is set at a value of subtracting the coordinate value Yp set at subsequent step b14 from the absolute Y-coordinate value Y2(i) at end point of line segment Si. The pen information ZB(m) of line segment SBm is set at "up."

At step b14, the coordinate value Xp is set at absolute X-coordinate value X2(i−1) of end point of line segment S(i−1), and the coordinate value Yp is set at absolute Y-coordinate value Y2(i−10) of end point of line segment S(i−1), and the process moves to step b6.

At step b8, if not parameter ST=A, advancing to step b15, the parameter ST=A is set, and the process moves to step b16. At step b16, relative coordinates XA(j), YA(j), and pen information ZA(j) of end point about line segment SAj for composing stroke data A are set, 1 is added to parameter j, and the process moves to step b14. More specifically, the relative X-coordinate value XA(j) of end point of line segment SAj is set at a value of subtracting the coordinate value Xp set at preceding step b14 from the absolute X-coordinate value X2(i) at end point of line segment Si. The relative Y-coordinate value YA(j) of end point of line segment SAj is set at a value of subtracting the coordinate value Yp set at preceding step b14 from the absolute Y-coordinate value Y2(i) at end point of line segment Si. The pen information ZA(j) of line segment SAj is set at "up."

By this processing, the master stroke data shown in FIG. 18 is divided into stroke data A and stroke data B as shown respectively in FIGS. 19A and 19B. Afterwards, the stroke data is displayed again on the display screen. In this case, a slight gap may be formed between stroke data A and stroke data B so that the vision may be easier to see by the user.

(Partial deletion of stroke data)

FIG. 21 is a diagram for explaining the process of deleting part of stroke data. This explanation is an example of deletion action, and it is not limited by this operation only.

Figure 21A:
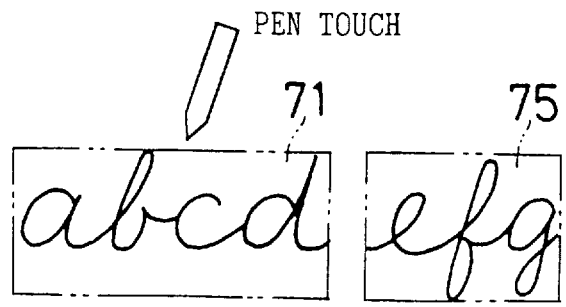
FIGS. 21A to 21E are diagrams showing procedure of deleting part of stroke data.
Figure 21B:
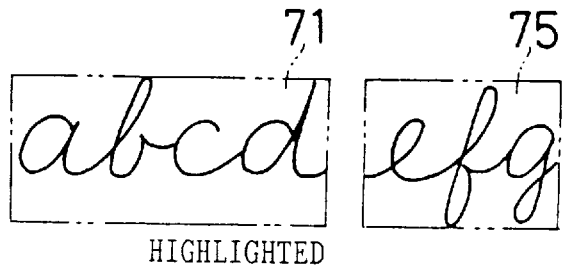

Herein, by prior display button or key manipulation or other pen manipulation, it is supposed that the manipulation to be done is instructed to be deletion action in the input/display apparatus 1. First, as shown in FIG. 21A, the objective stroke data 71 is specified by the pen 11. The coordinates of the position touched by the pen 11 in the stroke data 71 specified by the pen 11 are determined. This is realized in the same method as in the foregoing embodiment. When the objective stroke data 71 is judged, it is noticed by the user by, for example, highlighting the stroke data 71 as shown in FIG. 21B.

Figure 21C:
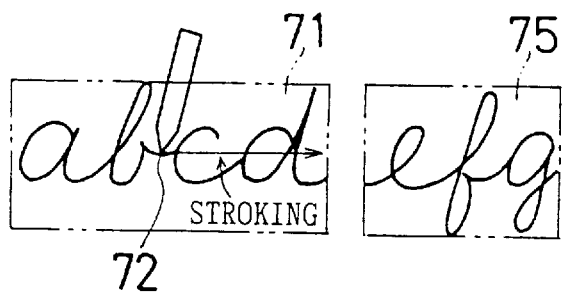
Figure 21D:
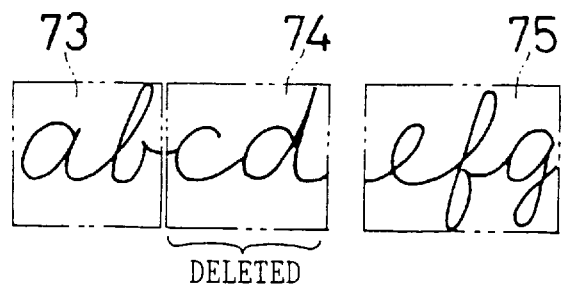

Next, as shown in FIG. 21C, by moving the pen 11 while stroking either to right or to left, from the boundary line of the position 72 touched by the pen 11 in the objective stroke data 71, it is instructed whether the deleting area is at the right or left side of the boundary line. As the pen 11 moves on the touch panel while stroking, the input/display apparatus for handwritten characters 1 sequentially samples the positions of the pen 11, so that the direction may be easily judged.

Figure 21E:
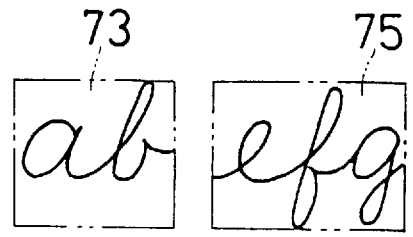

When the pen manipulation is thus over, the coordinate points touched by the pen 11 are the boundary line, the stroke data 71 is divided and displayed as two stroke data 73, 74 according to the division method of stroke data mentioned above as shown in FIG. 21D. Consequently, either specified side of divided stroke data 73, 74, for example, stroke data 74 is deleted, and when next stroke data 75 is displayed successively to the deleted stroke data 74, it may be displayed by filling up the vacancy as shown in FIG. 21E.

(Combination of stroke data)

FIG. 22 is a diagram for explaining a combining method of stroke data. In the first place, stroke data A and stroke data B to be combined are specified by touching by the pen 11 or other method. Herein, stroke data A and stroke data B are supposed to be identical in size in Y-direction of the rectangular regions. If not of same size, either stroke data A or B, or both must be integrated, and the Y-direction must be preliminarily reduced or magnified to a specific size. This integration process can be easily done as far as the stroke data is expressed in the system of relative coordinates.

Figure 22A:
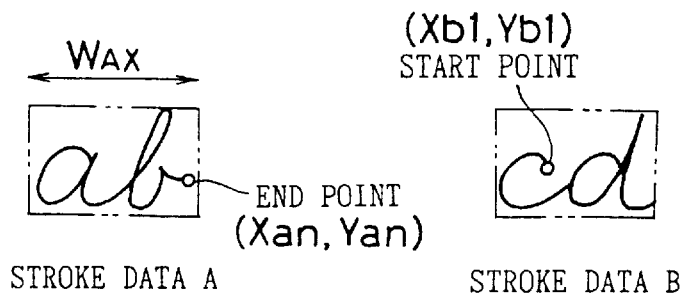
FIGS. 22A, 22B are diagrams explaining the process when combining stroke data.
Figure 22B:
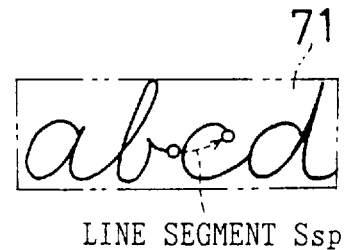

As shown in FIG. 22A, a new pen up line segment Ssp is defined so as to link end point (Xan, Yan) (absolute coordinates) of stroke data A, and start point (Xb1, Yb1) (absolute coordinates) of stroke data B (however, the origin of coordinates being different from stroke data A) (see FIG. 22B).

Figure 23:
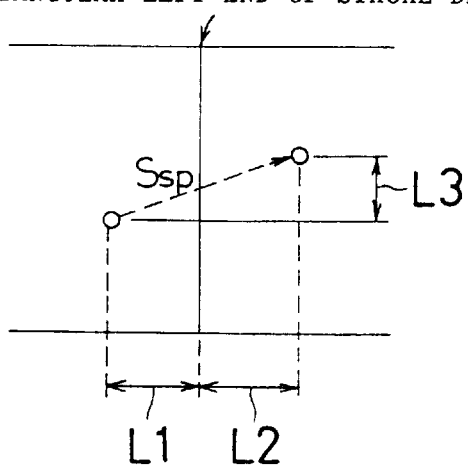
FIG. 23 is a diagram explaining the process when combining stroke data.

The relative coordinates of this line up segment Ssp are, as shown in FIG. 23, as follows:

relative X-coordinate: (length L1 of Xan and rectangular right end of stroke data A)+(length L2 of Xb1 and rectangular left end of stroke data B)

relative Y-coordinate: (coordinate Yan−coordinate Yb1 (length L3))

This line segment Ssp is added to the end of the stroke data A.

Consequently, line segment Sb1 to line segment Sbm of stroke data B are added. This processing is easy as far as expressed in the system of relative coordinates. The new stroke data combined with line segment Ssp and stroke data B is the intended stroke data. Afterwards, it is displayed again on the display screen.

Figure 24:
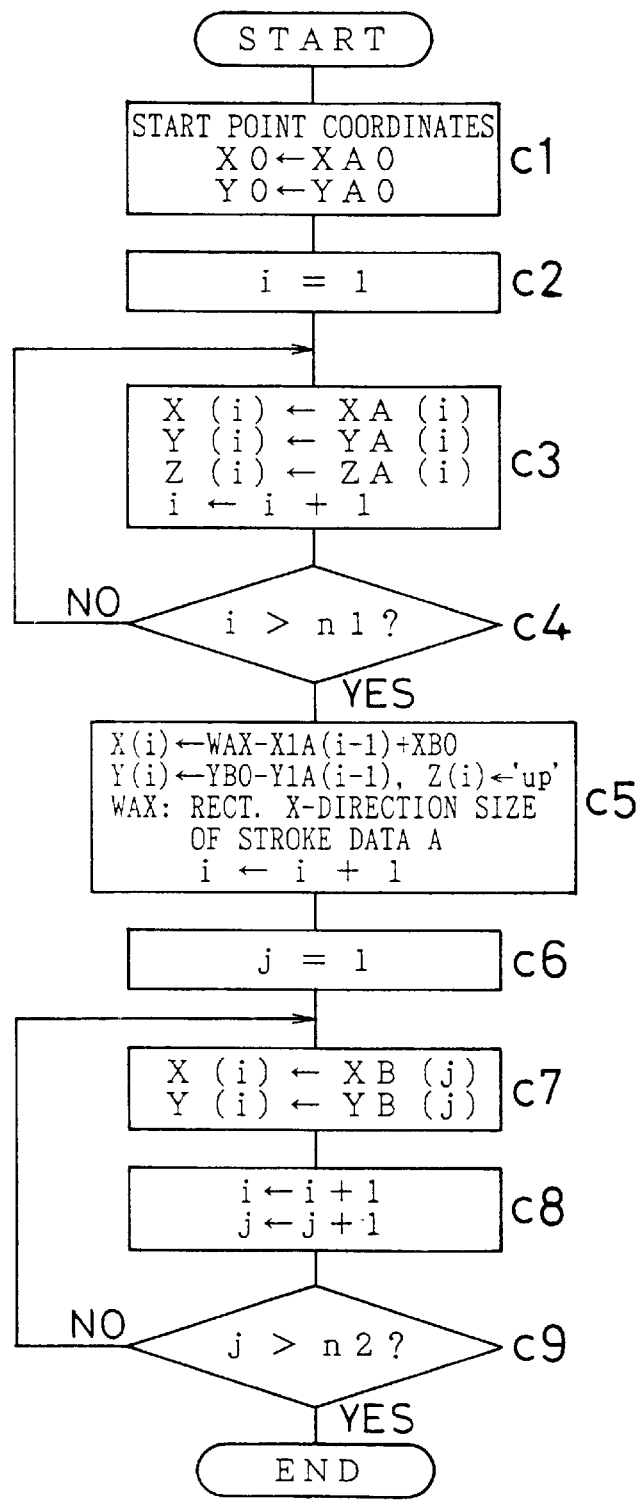
FIG. 24 is a flowchart showing the process when combining two stroke data.

FIG. 24 is a flowchart explaining the combining process of stroke data. As assumed herein, stroke data A and stroke data B shown in FIGS. 25A and 25B are combined into stroke data shown in FIG. 26. In each stroke data, for the ease of handling, it is supposed that the rectangular X-direction size WAX of stroke data has been calculated by prior processing.

At step c1, relative coordinates XA0, YA0 of start point of stroke data A are respectively set as start point coordinates X0, Y0 of combined stroke data. At step c2, parameter i=1 is set. At step c3, relative coordinate values XA(i), YA(i), and pen information ZA(i) of end point about line segment SAi for composing stroke data A are respectively set as relative coordinate values X(i), Y(i), and pen information Z(i) of end point about line segment Si for composing the combined stroke data. Adding 1 to parameter i, the process moves to step c4.

At step c4, it is judged if parameter i is greater than the number n1 of line segments for composing stroke data A. If not greater, returning to step c3, the line segment SAi of stroke data A is set at line segment Si of combined stroke data. If greater, that is, if parameter i=n1+1, the process moves to step c5.

At step c5, in order to combine stroke data A and stroke data B, line segment Ssp to be newly added is calculated and set. The relative X-coordinate X(i) of the end point of line segment Si (i=n1+1) is set at a value of (X-direction size WAX of rectangular region of stroke data A)−(absolute X-coordinate X1An1 of end point of line segment SAn1)+(relative X-coordinate XB0 of start point of stroke data B)

The relative Y-coordinate Y(i) of end point of line segment Si is set at a value of (relative Y-coordinate YB0 of start point of stroke data B)−(absolute Y-coordinate Y1An1 of end point of line segment SAn1)

The pen information Z(i) is set at "up." Adding 1 to parameter i, the process moves to step c6.

At step c6, parameter j=1 is set. At step c7, relative coordinate values XB(j), YB(j), and pen information ZB(j) of end point about line segment SBj for composing stroke data B are respectively set as relative coordinate values X(i), Y(i), and pen information Z(i) of end point about line segment Si for composing the combined stroke data. Adding 1 to parameters i and j, the process moves to step c9.

At step c9, it is judged if parameter j is greater than the number n2 of line segments for composing stroke data B. If parameter j is not greater than n2, returning to step c7, the line segment SBj for composing stroke data B is sequentially set as line segment Si for composing new stroke data. Processing is over when parameter j is greater than n2.

Integration process when the size of stroke data A and B differs in the rectangular region as mentioned above is executed as follows. In the rectangular region of stroke data A, the X-direction length is supposed to be Wxa and the Y-direction length to be Wya. Similarly, in the rectangular region of stroke data B, the X-direction length is supposed to be Wxb, and the Y-direction length to be Wyb. Moreover, Wxa is not equal to Wxb, and Wya is not equal to Wyb. Suppose stroke data B is integrated into stroke data A. The reducing or magnifying rate is determined on the basis of the Y-direction length. That is, Wya/Wyb is determined. By accumulating this ratio in the X-direction length Wxb and Y-direction length Wyb in the rectangular region of stroke data B, stroke data B is integrated into stroke data A. When integrating stroke data A into stroke data B, it is similarly realized, or the stroke data A and B may be reduced or magnified at different ratio, and integrated.

When combining different stroke data, size of character or type of line of stroke data can be matched. That is, the stroke data is composed by containing attribute data as additional information, that is, data showing thickness of characters and data showing type of line, aside from the coordinate data and additional information showing the pen state as explained in FIG. 2. Therefore, when combining, attribute data of either one stroke data should be matched with attribute data of other stroke data.

(Insertion of blank in stroke data)

FIG. 27 is a diagram for explaining the action for inserting a blank in the stroke data. Herein, it is supposed that the manipulation to be done here is instructed to be blank insertion action to the input/display apparatus 1 preliminarily by display button or key manipulation or other manipulation. The blank size to be inserted is too be specified preliminarily by numerals in dot units.

Figure 27A:
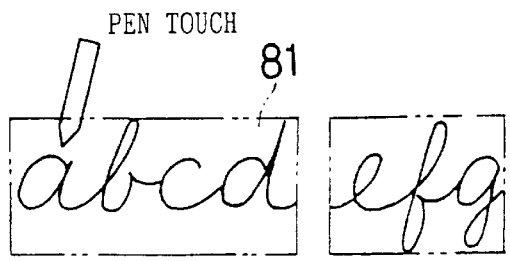
FIGS. 27A to 27C are diagrams explaining an operation example when inserting a blank space in stroke data.
Figure 27B:
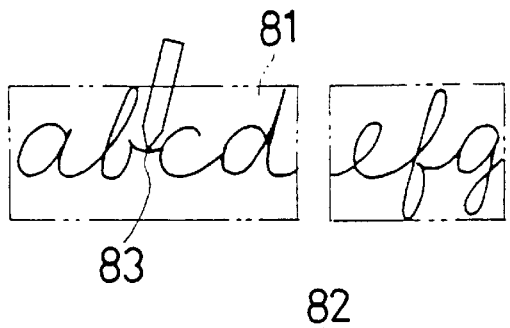
Figure 27C:
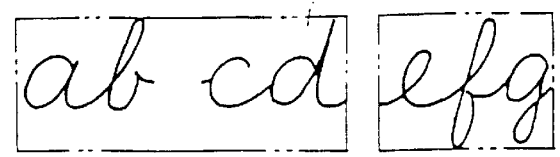

As shown in FIG. 27A, first, the objective stroke data 81 is specified by the pen 11, and then, as shown in FIG. 27B, the place for inserting the blank is specified again by pen touch in the stroke data 81. As a result, as shown in FIG. 27C, specified blank is inserted in specified position of the specified stroke data 81, and hence it is changed and displayed as new stroke data 82.

Figure 28A:
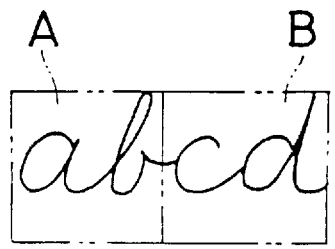
FIGS. 28A to 28C are diagrams showing externally the process when inserting a blank space in stroke data.

As internal processing, the coordinates of the stroke data 81 specified by the pen 11 and the point 83 touched by the pen 11 are determined. This is realized by the same method as in the foregoing embodiments, and the objective stroke data 81 and the point 83 in the stroke data can be determined. Defining the coordinates of the pen touched by the pen 11 as boundary line, the stroke data 81 is divided into stroke data A and stroke data B as shown in FIG. 28A according to the division method of stroke data mentioned above. For the sake of simplicity of explanation, the divided data is supposed to be transformed into relative coordinates. The stroke data A contains the start point of the stroke data 81.

Figure 28B:
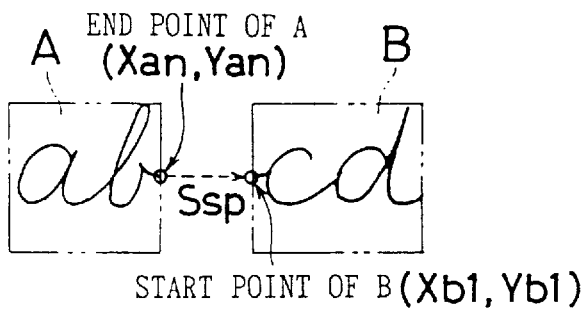

Consequently, as shown in FIG. 28B, a new pen up segment Ssp is defined so as to link the end point (Xan, Yan) (absolute coordinates) of and divided stroke data A, and the start point (Xb1,Yb1) (absolute coordinates, however, the origin of coordinate being different from stroke data A) of stroke data B. However, the relative coordinates of this pen up line segment Ssp are defined as follows:

relative X-coordinate: (length of coordinate Xan and rectangular right end of stroke data A)+(length of Xb1 and rectangular left end of stroke data B)+(specified blank dot size)

relative Y-coordinate: (coordinate Yb1−coordinate Yan)

This line segment Ssp is added to the end of stroke data A.

Figure 28C:
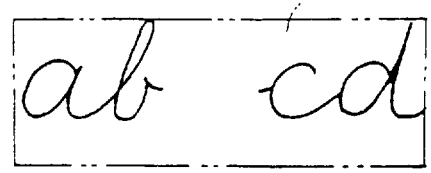

Next, line segments Sb1 to Sbm of stroke data B are added. Being expressed in relative coordinates, it is easy to add. The new stroke data 84 combined with the line segment Ssp and stroke data B is the intended stroke data in which the blank is inserted. Afterwards, the new stroke data is displayed again on the display screen, and is depicted as shown in FIG. 28C.

(Insertion of stroke data)

FIG. 29 is a diagram for explaining insertion processing of stroke data. Creation of new stroke data by inserting other stroke data into certain stroke data is realized by combining the division processing and combination processing of stroke data mentioned above. First, as shown in FIG. 29A, stroke data D to be inserted is specified. Then inserting stroke data C is specified. Stroke data can be specified in the same method as above. The specified stroke data D, C are read out from the RAM 4, normalized, and temporarily stored in the memory region.

Next, the inserting position of the inserting stroke data C is specified by using the pen 11. In the same process as when dividing stroke data, the insertion position in the objective stroke data can be obtained.

Figure 29A:
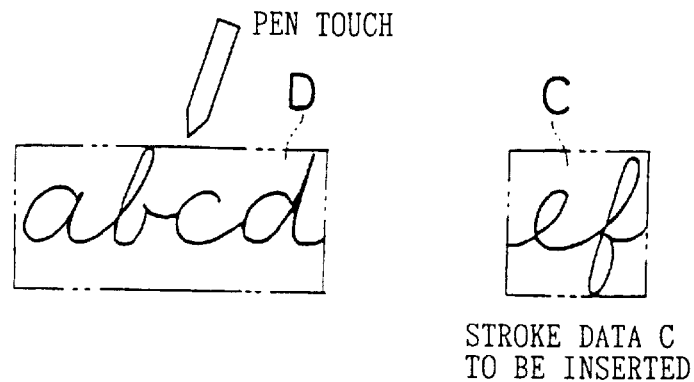
FIGS. 29A to 29E are diagrams showing operation example of inserting other stroke data into one stroke data.
Figure 29B:
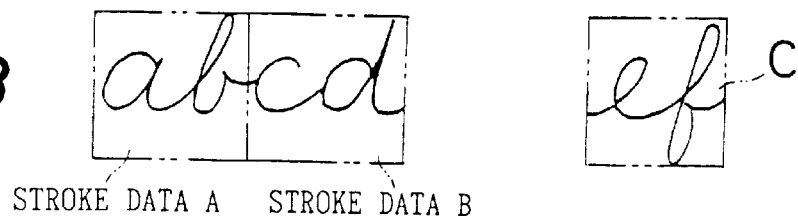
Figure 29C:
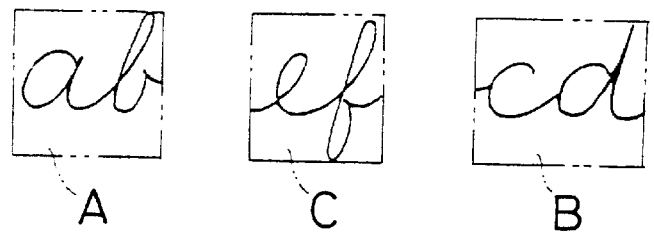
Figure 29D:
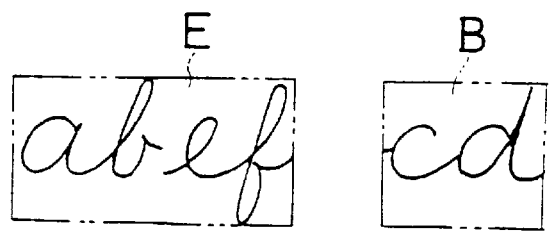
Figure 29E:
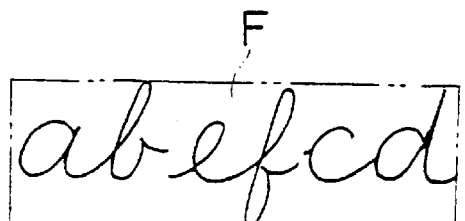

In succession, as shown in FIG. 29B, the stroke data D is divided into stroke data A and stroke data B, and the inserting stroke data C is moved in between the stroke data A and stroke data B as shown in FIG. 29C, and first as shown in FIG. 29D, the stroke data A and stroke data C are combined to make up stroke data E, then, as shown in FIG. 29E, the combined new stroke data E and stroke data B are further combined to make up stroke data F. As a result, the stroke data C is inserted into the stroke data D.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An input and display apparatus for handwritten characters comprising:

display means provided with a display surface in which orthogonal coordinates are defined, input means having a light transmitting input surface in which orthogonal coordinates are defined, which outputs coordinate points indicated by special indicating means, on the input surface disposed so as to overlap with the display surface, displaying the coordinate points on the display surface of the display means, corresponding to a plurality of coordinates points indicated at the time of handwritten input when the input surface discontinuously indicate by the indicating means, the input/display apparatus for handwritten characters including:

cursor display means for displaying a cursor indicating the position for input/display on the display surface of the display means;

stroke data preparing means for preparing handwritten stroke data consisting of coordinate points which are extracted after the end of handwritten input from among a plurality of coordinate points outputted from the input means at the time of the handwriting on the basis of a predetermined reference;

storage means for storing stroke data;

editing means for editing said handwritten stroke data, prior to character recognition, selected from the group consisting of editing means for changing the coordinate points composing one stroke data into plural coordinate point groups, and creating plural stroke data composed of coordinate point groups;

editing means for dividing the coordinate points composing one stroke data into plural coordinate point groups, erasing coordinate point groups selected from the coordinate point groups, and creating stroke data composed of the remaining coordinate point groups;

editing means for adding coordinate points for composing other stroke data, and creating a single stroke data composed of coordinate points composing one stroke data and the other stroke data;

editing means for dividing coordinate points composing one stroke data into two coordinate point groups, and creating another one stroke data by correcting the coordinates of coordinate points composing either one coordinate point group of the two divided coordinate point groups, so as to form a blank region when displayed in the display means;

editing means for dividing coordinate points composing one stroke data into two coordinate point groups, inserting coordinate points composing other stroke data between the two coordinate point groups, and creating another one stroke data composed of coordinate points composing the two coordinate point groups and the other stroke data;

editing means for setting a first rectangular region including stroke data to be divided deduces a coordinate point in the first rectangular region, corresponding to the coordinate point on an input board designated by the indicating means;

divides the first rectangular region by a division boundary line including the deduced coordinate point into two second rectangular regions; or editing means, after it divides stroke data into plural coordinate point groups, deletes a coordinate group selected by designation of the indicating means; and normalizing display means for setting rectangular coordinates of a predetermined size after a cursor position is displayed on a display surface of the display means, and displaying stroke data on rectangular coordinates.

2. The input and display apparatus for handwritten characters of claim 1, wherein the editing means divides the coordinate points composing one stroke data into plural coordinate point groups, erasing coordinate point groups selected from the coordinate point groups, and creating stroke data composed of the remaining coordinate point groups.

3. The input and display apparatus for handwritten characters of claim 1, wherein the editing means:

adds coordinate points for composing other stroke data, and creating a single stroke data composed of coordinate points composing one stroke data and the other stroke data.

4. The input and display apparatus for handwritten characters of claim 1, wherein the editing means divides coordinate points composing one stroke data into two coordinate point groups, and creating another one stroke data by correcting the coordinates of coordinate points composing either one coordinate point group of the two divided coordinate point groups, so as to form a blank region when displayed in the display means.

5. The input and display apparatus of claim 1, wherein the editing means divides coordinate points composing one stroke data into two coordinate point groups, inserting coordinate points composing other stroke data between the two coordinate point groups, and creating another one stroke data composed of coordinate points composing the the two coordinate point groups and the other stroke data.

6. The input and display apparatus for handwritten characters of claim 1, wherein the editing means:

sets a first rectangular region including stroke data to be divided;

deduces a coordinate point in the first rectangular region, corresponding to the coordinate point on an input board designated by the indicating means; and divides the first rectangular region by a division boundary line including the deduced coordinate point into two second rectangular regions.

7. The input and display apparatus for handwritten characters of claim 2, wherein the editing means, after it divides stroke data into plural coordinate point groups, deletes a coordinate group selected by designation of the indicating means.

8. The input and display apparatus for handwritten characters of claim 3, wherein the editing means creates a pen up line segment of a predetermined length, in which the end point of one stroke data of two stroke data and is a start point and the start point of the other stroke data is an end point, adds the created pen up line segment to the end of the one stroke data, and additionally adds the stroke data of the other stroke data.

9. The input and display apparatus of claim 3, wherein the editing means creates one stroke data by conforming the sizes of the rectangular regions of two stroke data to each other.

10. The input and display apparatus for handwritten characters of claim 3, wherein the stroke data includes attribute data indicating the width and type of character line, and the editing means creates one stroke data by conforming the attribute data of the two stroke data.

11. The input and display apparatus for handwritten characters of claim 4, wherein the editing means, after it divides stroke data into a first and second stroke data of two coordinate groups, creates a pen up line segment of a length which forms a blank region of a predetermined size, the end point of the first stroke data as a start point, and the start point of the second stroke data as an end point, adds the created pen up line segment to the end of the first stroke data, and additionally adds the second stroke data.

12. The input and display apparatus for handwritten characters, of claim 5 wherein the editing means, after it divides stroke data into first and second stroke data of two coordinate point groups, creates a pen up line segment of a predetermined length, in which the start point of the stroke data to be inserted is an end point, adds the created pen up line segment to the end of the first stroke data, additionally creates another stroke data by adding the inserted stroke data, creates a pen up line segment of a predetermined length, in which the end point of the other stroke data is a start point, and the start point of the other stroke data as an end point, adds the created pen up line segment to the end of another stroke data, and additionally creates one stroke data by adding the second stroke data.

13. The input and display apparatus for handwritten characters of claim 1, wherein the stroke data preparing means includes one stroke data which consists of a group of coordinate points selected on the basis of the predetermined reference which is a predetermined period after the start of handwriting input, so that the one stroke data includes a plurality of pen downs and pen ups.

14. The input and display apparatus for handwritten characters, of claim 13, wherein said predetermined period is a period of time from a beginning point of time to an end point of time of handwritten input and said end point of time.

15. The input and display apparatus for handwriting characters of claim 14, further including means for predetermining and for designating the end point of time.

* * * * *